US012161228B2

(12) United States Patent
Driscoll et al.

(10) Patent No.: US 12,161,228 B2
(45) Date of Patent: Dec. 10, 2024

(54) METHODS FOR AIRBED PUMP CALIBRATIONS AND PRESSURE MEASUREMENTS

(71) Applicant: American National Manufacturing, Inc., Corona, CA (US)

(72) Inventors: David Delory Driscoll, Milwaukee, WI (US); James A. Rodrian, Grafton, WI (US)

(73) Assignee: AMERICAN NATIONAL MANUFACTURING, INC., Corona, CA (US)

( * ) Notice: Subject to any disclaimer, the term of this patent is extended or adjusted under 35 U.S.C. 154(b) by 1047 days.

(21) Appl. No.: 17/106,136

(22) Filed: Nov. 29, 2020

(65) Prior Publication Data

US 2021/0076834 A1 Mar. 18, 2021

Related U.S. Application Data

(63) Continuation-in-part of application No. 15/877,018, filed on Jan. 22, 2018, now Pat. No. 10,849,436, (Continued)

(51) Int. Cl.
*A47C 27/08* (2006.01)
*A61G 7/057* (2006.01)

(52) U.S. Cl.
CPC .......... *A47C 27/083* (2013.01); *A47C 27/081* (2013.01); *A47C 27/082* (2013.01); *A61G 7/05769* (2013.01)

(58) Field of Classification Search
CPC ... A47C 27/081; A47C 27/082; A47C 27/083; A47C 27/084; A47C 31/008;
(Continued)

(56) References Cited

U.S. PATENT DOCUMENTS 4,829,616 A * 5/1989 Walker .................. F04D 25/084 251/129.05
5,020,176 A 6/1991 Dotson
(Continued)

OTHER PUBLICATIONS

International Search Report and Written Opinion for co-pending International Application No. PCT/US2014/070494 date Mar. 19, 2015.

*Primary Examiner* — David R Hare
(74) *Attorney, Agent, or Firm* — Spencer Fane LLP

(57) ABSTRACT

A method for inflating or deflating an air mattress chamber, includes: receiving a user input; inflating or deflating the air mattress chamber; obtaining pressure measurements corresponding to the air mattress chamber; determining first and second constants corresponding to inflation and deflation of the air mattress chamber; comparing a dynamically-obtained static pressure value to a threshold value; and presenting the dynamically-obtained static pressure value to a user on a display of a user remote. Methods for calculating and updating the first and second constants. A method for performing an offset measurement and latency qualification. A method for controlling an inflate operation of air mattress chamber based on a predetermined motor speed corresponding to a mode of operation. A method of controlling the deflation an air mattress chamber utilizing first and second stage exhaust ports to control an exhaust.

26 Claims, 11 Drawing Sheets

Related U.S. Application Data which is a continuation of application No. 14/571,834, filed on Dec. 16, 2014, now Pat. No. 9,913,547.

(60) Provisional application No. 61/916,516, filed on Dec. 16, 2013.

(58) Field of Classification Search
CPC .............. A47C 31/123; A61G 7/05746; A61G 7/05761; A61G 7/05769; A61G 7/05776; F04D 27/004; G01L 13/00; G01L 13/06
USPC .............................................................. 5/713
See application file for complete search history.

(56) References Cited

U.S. PATENT DOCUMENTS

| | | | | |
|---|---|---|---|---|
| 5,051,673 | A * | 9/1991 | Goodwin | A61G 7/0513 5/713 |
| 5,848,450 | A | 12/1998 | Oexman et al. | |
| 6,047,423 | A | 4/2000 | Larson | |
| 6,058,537 | A | 5/2000 | Larson | |
| 6,115,860 | A | 9/2000 | Vrzalik | |
| 6,483,264 | B1 * | 11/2002 | Shafer | A47C 27/10 318/16 |
| 6,686,711 | B2 | 2/2004 | Rose et al. | |
| 6,763,541 | B2 * | 7/2004 | Mahoney | A47C 27/082 5/904 |
| 7,225,488 | B2 | 6/2007 | Wu | |
| 7,886,387 | B2 | 2/2011 | Riley et al. | |
| 8,769,747 | B2 | 7/2014 | Mahoney et al. | |
| 9,149,126 | B2 | 10/2015 | Rawls-Meehan | |
| 9,510,688 | B2 * | 12/2016 | Nunn | A61B 5/4806 |
| 9,913,547 | B2 | 3/2018 | Driscoll, Jr. et al. | |
| 10,441,086 | B2 * | 10/2019 | Nunn | A47C 31/123 |
| 2006/0053561 | A1 | 3/2006 | Metzger et al. | |
| 2007/0227594 | A1 | 10/2007 | Chaffee | |
| 2009/0314354 | A1 | 12/2009 | Chaffee | |
| 2011/0138539 | A1 | 6/2011 | Mahoney et al. | |
| 2012/0304391 | A1 | 12/2012 | Driscoll, Jr. et al. | |
| 2013/0031725 | A1 * | 2/2013 | Riley | A47C 27/083 5/713 |
| 2015/0164236 | A1 * | 6/2015 | Driscoll, Jr. | A47C 27/083 5/713 |

* cited by examiner

METHODS FOR AIRBED PUMP CALIBRATIONS AND PRESSURE MEASUREMENTS

CROSS-REFERENCE TO RELATED APPLICATIONS

This application is a Continuation-in-Part of U.S. patent application Ser. No. 15/877,018, filed Jan. 22, 2018, titled AIRBED PUMP CALIBRATION & PRESSURE MEASUREMENT, which is a Continuation of U.S. patent application Ser. No. 14/571,834, filed Dec. 16, 2014, now U.S. Pat. No. 9,913,547, issued on Mar. 13, 2018, titled AIRBED PUMP CALIBRATION & PRESSURE MEASUREMENT, which claimed the benefit of Provisional Application No. 61/916,516, filed Dec. 16, 2013, titled AIRBED PUMP CALIBRATION & PRESSURE MEASUREMENT, all of which are hereby incorporated by reference in their entirety.

BACKGROUND

The airbed market has evolved over the years. Early airbeds used manual pumps that did not measure pressure. More recent airbeds have included electric blower motors that had both wired and wireless hand controls, as well as diaphragm pumps (including both single and dual output-type diaphragm pumps) with hand controls.

An example of a simple type of remote hand controls are remotes which utilize up/down buttons and which do not involve a visual display indicating pressure measurement. Additionally, for conventional remotes that do incorporate pressure displays, the display reflects a pressure reading that has typically been derived one of a few ways.

First, in a "target system," the user inputs a target pressure and the pump inflates or deflates to that targeted static chamber pressure. During pump operation the display on the handheld remote control is either blank, blinking or shows the desired target pressure. When target pressure is achieved the pump stops operation and the static pressure of the air mattress chamber is displayed. To accomplish this, the system, for example, actuates the appropriate solenoids to expose a pressure sensor to a desired chamber in isolation and takes a static pressure reading corresponding to the desired chamber. Multiple iterations of the static pressure measurement are often needed for a particular inflation or deflation operation.

An alternative to the "target system" is a "real-time" system, for which the user activates the pump by inputting inflate/deflate commands. There is no "target" pressure. The pump operates as long as the user depresses inflate/deflate buttons. When the button is released, the static chamber pressure can be measured and displayed. The display is most frequently shown in either psi or millimeters of mercury. Further, while the pump executes the command, the display may reflect either a flowing dynamic pressure, or in some cases, something like an indicative "Sleep Number" which reflects an allowable range of possible pressures. Other graphical representations may be used as well, such as bars that light up, segments that light up, etc.

In conventional systems, a cost effective solution for accurately controlling static pressure in a multi-zone chamber system is to use a single fill and drain tube connecting each discrete zone of an air mattress to a control manifold and then to measure pressure in the manifold's common chamber using a single low-cost pressure transducer. Alternative higher cost strategies employed in conventional systems utilize a dedicated static line to each chamber and individual, more expensive, low-latency pressure transducers. These conventional systems are unable to accurately determine the actual pressure of an arbitrary chamber of the air mattress (typically several feet away) which is connected with a pneumatically variable system during inflation and deflation operations.

Conventional systems that strive to provide highly accurate pressure measurements are generally based solely on "static" measurements (i.e., measurements taken while air is not flowing at or near the respective pressure transducer(s)), which causes the systems to be slow, to require many multiple stop-and-check iterations, and to be frustrating to consumers as they can behave in a counterintuitive fashion by overshooting and/or undershooting specific target pressure levels. The iterative seeking behavior of these systems also cause them to be noisy, which is undesirable in long-term care and medical applications as well as consumer applications.

SUMMARY

In an embodiment, the invention provides an airbed system, connectable to an air mattress chamber of an air mattress, the system including: a pressure sensor, configured to obtain pressure measurements corresponding to the air mattress chamber; and a control unit, including a processor, configured to operate a pump and valves of the airbed system to inflate and deflate the air mattress chamber, and to determine first and second constants corresponding to inflation of the air mattress chamber and third and fourth constants corresponding to deflation of the air mattress chamber. The control unit is further configured to, during an inflate operation where the air mattress chamber is being inflated, obtain a dynamic inflation pressure measurement based on a dynamic inflation output from the pressure sensor, and to utilize the first and second constants to determine a dynamically-obtained static pressure value based on the dynamic inflation pressure measurement. The control unit is also further configured to, during a deflate operation where the air mattress chamber is being deflated, obtain a dynamic deflation pressure measurement based on a dynamic deflation output from the pressure sensor, and to utilize the third and fourth constants to determine a dynamically-obtained static pressure value based on the dynamic deflation pressure measurement.

In another embodiment, the invention provides a method for inflating or deflating an air mattress chamber of an air mattress, the method including: receiving, by an airbed system, user input corresponding to inflation or deflation of the air mattress chamber; inflating or deflating, by the airbed system, the air mattress chamber based on the received user input; and during the inflation or deflation, obtaining, by the airbed system, a dynamic pressure measurement based on an output from a pressure sensor of the airbed system and determining, by the airbed system, a corresponding dynamically-obtained static pressure value based on the dynamic pressure measurement, a first constant, and a second constant. The dynamically-obtained static pressure value determined based on the dynamic pressure measurement corresponds to a static pressure measurement that would be obtained if the inflation or deflation operation was stopped at the point the dynamic pressure measurement was obtained with the static pressure measurement being taken under static airflow conditions subsequent to stopping the inflation or deflation operation.

In yet another embodiment, the invention provides a non-transitory processor-readable medium, having processor-executable instructions stored thereon for inflating or deflating an air mattress chamber of an air mattress, the processor-executable instructions, when executed by a processor, facilitating performance of the following: receiving user input corresponding to inflation or deflation of the air mattress chamber; inflating or deflating the air mattress chamber based on the received user input; and during the inflation or deflation, obtaining a dynamic pressure measurement based on an output from a pressure sensor and determining a corresponding dynamically-obtained static pressure value based on the dynamic pressure measurement, a first constant, and a second constant. The dynamically-obtained static pressure value determined based on the dynamic pressure measurement corresponds to a static pressure measurement that would be obtained if the inflation or deflation operation was stopped at the point the dynamic pressure measurement was obtained with the static pressure measurement being taken under static airflow conditions subsequent to stopping the inflation or deflation operation.

In yet another embodiment of the invention, the method for inflating or deflating an air mattress chamber of an air mattress further includes, comparing the dynamically-obtained static pressure value to a threshold value; and in response to a result of comparing step, stopping the inflating or deflating of the air mattress chamber.

In yet another embodiment of the invention, the method for inflating or deflating an air mattress chamber of an air mattress further includes, presenting the determined dynamically-obtained static pressure value to a user on a display of a user remote of the airbed system.

In yet another embodiment of the invention, the method for inflating or deflating an air mattress chamber of an air mattress, wherein the inflating or deflating of the air mattress chamber is performed for a first period of time; and wherein the method further comprising: obtaining a first dynamic pressure measurement during the inflating or deflating proximate to an end of the first period of time; stopping the inflating or deflating at the end of the first period of time; waiting a second period of time; obtaining a first static pressure measurement after the second period of time; and updating the first constant and the second constant based on the first dynamic pressure measurement and the first static pressure measurement.

In yet another embodiment of the invention, the method for inflating or deflating an air mattress chamber of an air mattress further includes, exposing the pressure sensor to an external environment; and performing an offset measurement while the pressure sensor is exposed to the external environment; wherein the offset measurement is used in obtaining the dynamic pressure measurement.

In yet another embodiment of the invention, the method for inflating or deflating an air mattress chamber of an air mattress, wherein the first constant and the second constant correspond to inflation of the air mattress chamber, and are determined or updated based on a calibration procedure comprising: inflating the air mattress chamber for a first period of time, obtaining a first dynamic pressure measurement during inflation proximate to an end of the first period of time, stopping the inflation at the end of the first period of time, waiting a second period of time, and obtaining a first static pressure measurement after the second period of time; inflating the air mattress chamber after obtaining the first static pressure measurement for a third period of time, obtaining a second dynamic pressure measurement during inflation proximate to an end of the third period of time, stopping the inflation at the end of the third period of time, waiting a fourth period of time, and obtaining a second static pressure measurement after the fourth period of time; and determining the first and second constants based on the first dynamic pressure measurement, the first static pressure measurement, the second dynamic pressure measurement, and the second static pressure measurement.

In yet another embodiment of the invention, the method for inflating or deflating an air mattress chamber of an air mattress further includes, calculating the first constant based on a M formula comprising: $M=(DP_2-DP_1)/(SP_2-SP_1)$, wherein M is the first constant, $DP_2$ is the second dynamic pressure measurement, $DP_1$ is the first dynamic pressure measurement, $SP_2$ is the second static pressure measurement, and $SP_1$ is the first static pressure measurement.

In yet another embodiment of the invention, the method for inflating or deflating an air mattress chamber of an air mattress further includes, calculating the second constant based on a B formula comprising: $B=SP_2-(M*DP_2)$, wherein B is the second constant, $SP_2$ is the second static pressure measurement, M is the first constant, and $DP_2$ is the second dynamic pressure measurement.

In yet another embodiment of the invention, the method for inflating or deflating an air mattress chamber of an air mattress, wherein the first constant and the second constant correspond to deflation of the air mattress chamber, and are determined or updated based on a calibration procedure comprising: deflating the air mattress chamber for a first period of time, obtaining a first dynamic pressure measurement during deflation proximate to an end of the first period of time, stopping the deflation at the end of the first period of time, waiting a second period of time, and obtaining a first static pressure measurement after the second period of time; deflating the air mattress chamber after obtaining the first static pressure measurement for a third period of time, obtaining a second dynamic pressure measurement during deflation proximate to an end of the third period of time, stopping the deflation at the end of the third period of time, waiting a fourth period of time, and obtaining a second static pressure measurement after the fourth period of time; and determining the first and second constants based on the first dynamic pressure measurement, the first static pressure measurement, the second dynamic pressure measurement, and the second static pressure measurement.

In yet another embodiment of the invention, the method for inflating or deflating an air mattress chamber of an air mattress, wherein the dynamically-obtained static pressure value is based a formula comprising: $SP=M*DP+B$, wherein SP is the dynamically-obtained static pressure value, M is the first constant, DP is the dynamic pressure measurement, and B is the second constant.

In yet another embodiment of the invention, the method for inflating or deflating an air mattress chamber of an air mattress further includes, filtering the output based on the pressure sensor over a latency period; and performing a latency qualification such that the dynamic inflation pressure measurement corresponds to the filtered output.

In yet another embodiment of the invention, a method for controlling an inflate operation of an air mattress chamber of an air mattress, the method includes, receiving, by an airbed system, a start command corresponding to inflation of the air mattress chamber; obtaining, by the airbed system, a variable speed command corresponding to a mode of operation; adjusting, by the airbed system, a speed of a motor to a predetermined motor speed based on the mode of operation; inflating, by the airbed system, the air mattress chamber based on the predetermined motor speed; and during the inflation, obtaining, by the airbed system, a dynamic inflation pressure measurement based on an output from a pressure sensor, and determining a dynamically-obtained static pressure value based on an inflation formula comprising: $SP=M_{mode}*DIP+B_{mode}$, wherein SP is the dynamically-obtained static pressure value, $M_{mode}$ is a first constant associated with the mode of operation, DIP is the dynamic inflation pressure measurement, and $B_{mode}$ is a second constant associated with the mode of operation. The dynamically-obtained static pressure value determined based on the dynamic pressure measurement corresponds to a static pressure measurement that would be obtained if the inflation operation was stopped at a point the dynamic pressure measurement was obtained with the static pressure measurement being taken under static airflow conditions subsequent to stopping the inflation operation.

In yet another embodiment of the invention, the method for controlling an inflate operation of an air mattress chamber of an air mattress further includes, stopping the inflation operation if the dynamically-obtained static pressure value is greater than a target pressure.

In yet another embodiment of the invention, the method for controlling an inflate operation of an air mattress chamber of an air mattress, wherein the mode of operation comprising one of a normal mode having a first predetermined motor speed, or a quiet mode having a second predetermined motor speed, the first predetermined motor speed being greater than the second predetermined motor speed.

In yet another embodiment of the invention, a method for controlling the deflation of an air mattress chamber of an air mattress, the method includes, providing an airbed system comprising a first stage exhaust port configured for pneumatic communication with the air mattress chamber; receiving, by the airbed system, a deflate command corresponding to deflation of the air mattress chamber; obtaining, by the airbed system, a static pressure measurement of the air mattress chamber based on an output from a pressure sensor; comparing the static pressure measurement to a second stage threshold value; opening, by the airbed system, the first stage exhaust port if the static pressure measurement is greater than the second stage threshold value; deflating the air mattress chamber; and during the deflation, obtaining, by the airbed system, a dynamic deflation pressure measurement based on a dynamic deflation output from the pressure sensor, and determining a first dynamically-obtained static pressure value based on a first stage deflation formula comprising: $SP_{first}=M_{deflate.firststage}*DIP+B_{deflate.firststage}$, wherein $SP_{first}$ is the first dynamically-obtained static pressure value, $M_{deflate.firststage}$ is a first deflate constant associated with the first stage exhaust port, DIP is the dynamic deflation pressure measurement, and $B_{deflate.firststage}$ is a second deflate constant associated with the first stage exhaust port. The first dynamically-obtained static pressure value determined based on the dynamic deflation pressure measurement corresponds to a static pressure measurement that would be obtained if the deflation was stopped at a point the dynamic deflation pressure measurement was obtained with the static pressure measurement being taken under static airflow conditions subsequent to stopping the deflation.

In yet another embodiment of the invention, the method for controlling the deflation of an air mattress chamber of an air mattress further includes, closing the first stage exhaust port when the first dynamically-obtained static pressure value is less than or equal to a target pressure.

In yet another embodiment of the invention, a method for controlling the deflation of an air mattress chamber of an air mattress, the method includes, providing an airbed system including: a first stage exhaust port; and a second stage exhaust port, wherein the first and second stage exhaust ports are configured for pneumatic communication with the air mattress chamber; receiving, by the airbed system, a deflate command corresponding to deflation of the air mattress chamber; obtaining, the by the airbed system, a static pressure measurement of the air mattress chamber based on an output from a pressure sensor; comparing the static pressure measurement to a second stage threshold value; opening, by the airbed system, the first stage exhaust port if the static pressure measurement is greater than the second stage threshold value; deflating the air mattress chamber; during the deflation, obtaining, by the airbed system, a dynamic deflation pressure measurement based on a dynamic deflation output from the pressure sensor, and determining a first dynamically-obtained static pressure value based on a first stage deflation formula comprising: $SP_{first}=M_{deflate.firststage}*DIP+B_{deflate.firststage}$, wherein $SP_{first}$ is the first dynamically-obtained static pressure value, $M_{deflate.firststage}$ is a first deflate constant associated with the first stage exhaust port, DIP is the dynamic deflation pressure measurement, and $B_{deflate.firststage}$ is a second deflate constant associated with the first stage exhaust port; opening, by the airbed system, the second stage exhaust port if the first dynamically-obtained static pressure value is less than or equal to the second stage threshold value; and during the deflation, obtaining, by the airbed system, a dynamic deflation pressure measurement based on a dynamic deflation output from the pressure sensor, and determining a second dynamically-obtained static pressure value based on a second stage deflation formula comprising: $SP_{second}=M_{deflate.secondstage}*DIP+B_{deflate.secondstage}$, wherein $SP_{second}$ is the second dynamically-obtained static pressure value, $M_{deflate.secondstage}$ is a first deflate constant associated with the second stage exhaust port, DIP is the dynamic deflation pressure measurement, and $B_{deflate.secondstage}$ is a second deflate constant associated with the second stage exhaust port. The first and second dynamically-obtained static pressure values determined based on the dynamic deflation pressure measurement correspond to a static pressure measurements that would be obtained if the deflation was stopped at a point the dynamic deflation pressure measurements were obtained with the static pressure measurement being taken under static airflow conditions subsequent to stopping the deflation.

In yet another embodiment of the invention, the method for controlling the deflation of an air mattress chamber of an air mattress further includes, closing, by the airbed system, the first stage exhaust port and the second stage exhaust port if the second dynamically-obtained static pressure value is less than or equal to a target pressure.

In yet another embodiment of the invention, the method for controlling the deflation of an air mattress chamber of an air mattress, wherein the first stage exhaust port includes a first head loss coefficient, and the second stage exhaust port includes a second head loss coefficient. The first head loss coefficient may be greater than the second head loss coefficient.

In yet another embodiment of the invention, the method for controlling the deflation of an air mattress chamber of an air mattress, wherein the first stage exhaust port includes a flow restrictor.

In yet another embodiment of the invention, a method for controlling the deflation of an air mattress chamber of an air mattress, the method includes, providing an airbed system having a first stage exhaust port and a second stage exhaust port, wherein the first and second stage exhaust ports are configured for pneumatic communication with the air mattress chamber; receiving, by the airbed system, a deflate command corresponding to deflation of the air mattress chamber; obtaining, by the airbed system, a static pressure measurement of the air mattress chamber based on an output from a pressure sensor; comparing the static pressure measurement to a second stage threshold value; opening, by the airbed system, the first stage exhaust port and the second stage exhaust port if the static pressure measurement is less than or equal to the second stage threshold value; deflating the air mattress chamber; and during the deflation, obtaining, by the airbed system, a dynamic deflation pressure measurement based on a dynamic deflation output from the pressure sensor, and determining a second dynamically-obtained static pressure value based on a second stage deflation formula comprising: $SP_{second}=M_{deflate.secondstage}*DIP+B_{deflate.secondstage}$, wherein $SP_{second}$ is the second dynamically-obtained static pressure value, $M_{deflate.secondstage}$ is a first deflate constant associated with the second stage exhaust port, DIP is the dynamic deflation pressure measurement, and $B_{deflate.secondstage}$ is a second deflate constant associated with the second stage exhaust port. The second dynamically-obtained static pressure value determined based on the dynamic deflation pressure measurement corresponds to a static pressure measurement that would be obtained if the deflation was stopped at a point the dynamic deflation pressure measurement was obtained with the static pressure measurement being taken under static airflow conditions subsequent to stopping the deflation.

In yet another embodiment of the invention, method for controlling the deflation of an air mattress chamber of an air mattress further includes, closing, by the airbed system, the first stage exhaust port and the second stage exhaust port if the second dynamically-obtained static pressure value is less than or equal to a target pressure.

In yet another embodiment of the invention, the method for controlling the deflation of an air mattress chamber of an air mattress, wherein the first stage exhaust port comprises a first head loss coefficient, and wherein the second stage exhaust port comprises a second head loss coefficient. The first head loss coefficient may be greater than the second head loss coefficient.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Airbed Environment

Figure 1A:
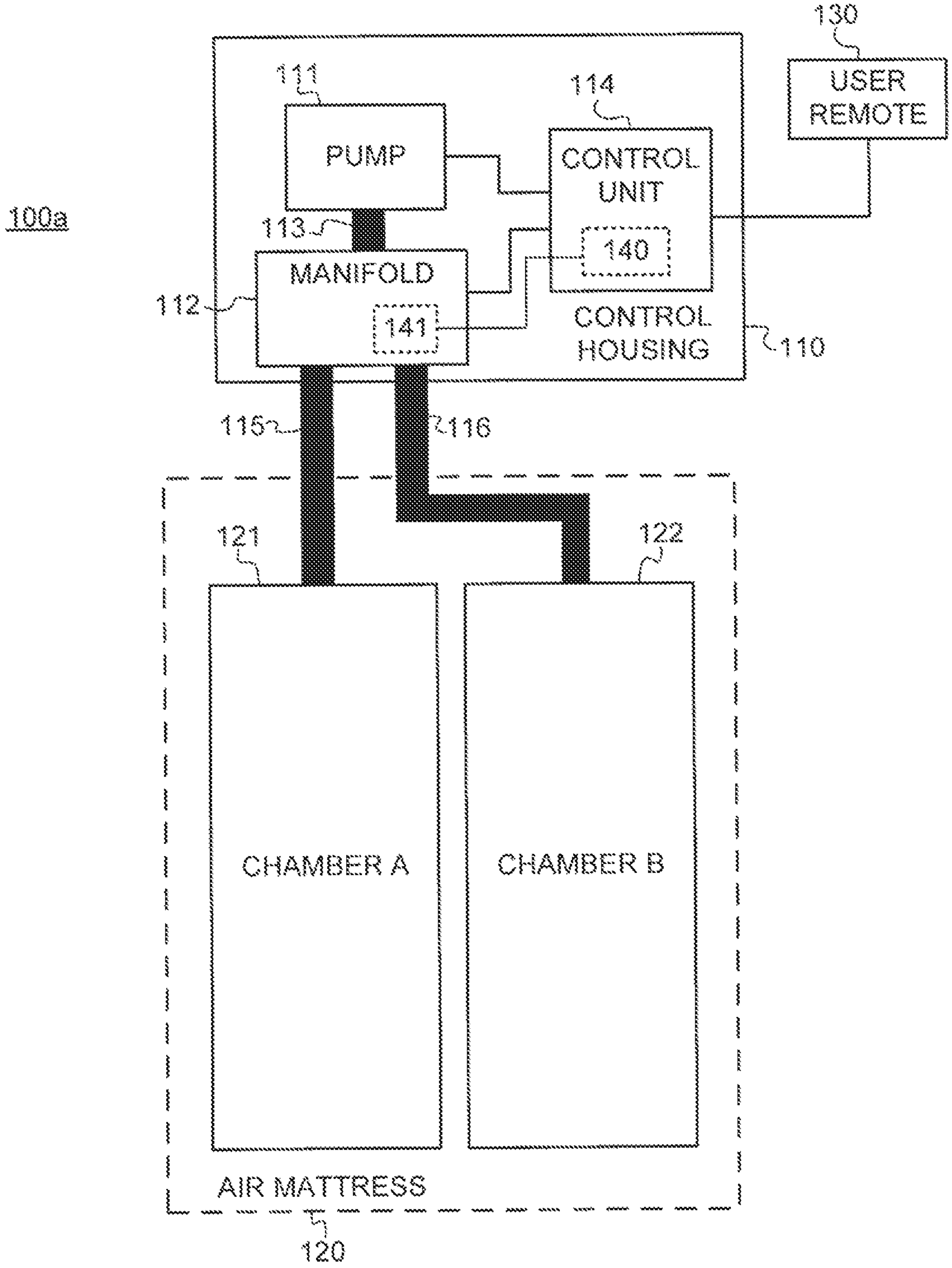
FIGS. 1A and 1B are block diagrams of exemplary airbed environments useable with embodiments of the described principles.
Figure 1B:
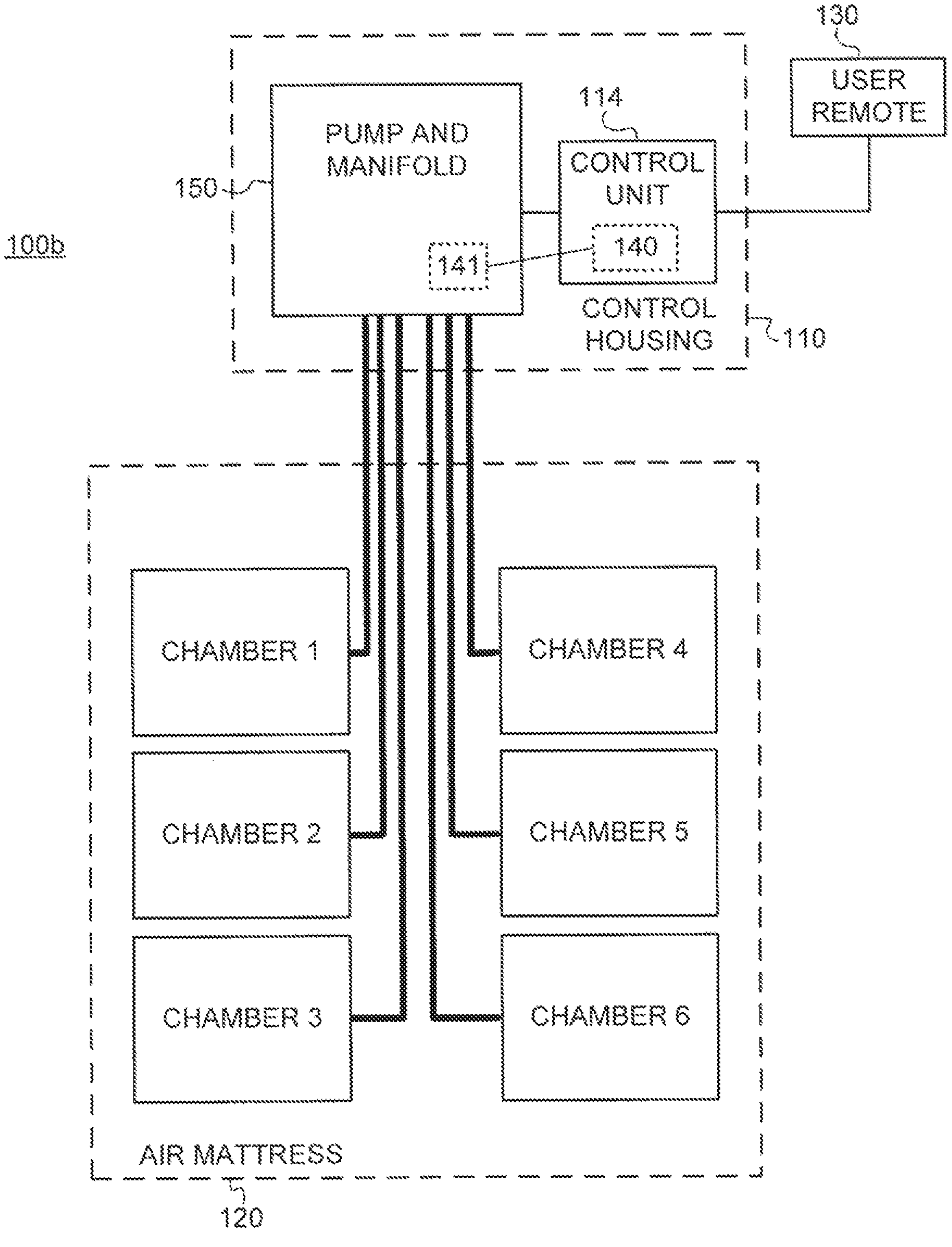

Exemplary airbed environments with which embodiments of the invention may be used are depicted by FIGS. 1A and 1B. It will be appreciated that the described environments are examples, and do not imply any limitation regarding the use of other environments to practice the invention.

In FIG. 1A, the airbed environment 100*a* includes a control housing 110 and an air mattress 120. The control housing further includes a control unit 114 and a pump 111, wherein the pump 111 is connected to chambers A 121 and B 122 via an appropriate connection (e.g., tubing). For example, in FIG. 1A, the pump 111 is connected to the chambers through tubes 113, 115 and 116 and a manifold 112, and the pathways include valves (not depicted) suitable for isolating/connecting the chambers to/from the manifold, isolating/connecting the manifold to atmosphere, etc. It will be appreciated that, for example, where the pump 111 is a dual-output type diaphragm pump, tube 113 is representative of two output tubes. It will also be appreciated that, for example, chambers A 121 and B 122 may be two chambers of a single air bladder divided into the two chambers by a shared wall within the single air bladder.

In an exemplary implementation of the environment 100*a*, the valves may be provided at the connection between the manifold 112 and the tubes 113, 115, and 116, and the valves may be in communication with the control unit 114 such that the control unit is configured to open and close the valves. Solenoid plunger style valves may be preferable due to their electromechanical control capabilities and relatively low cost, but it will be appreciated that other types of valves may be used. The tubes may be Polyvinyl Chloride (PVC) or silicone rubber or may be any other appropriate connections for transferring a gas, such as air, from a pump outlet to air mattress chambers. The manifold 112 may be manufactured out of thermoplastic or any other suitable type of material with sufficient mechanical strength to contain the amount of pressure required. For example, for applications requiring about 1 psi of air, materials such as Nylon PA6, Acrylonitrile Butadiene Styrene (ABS), Polypropylene (PP), Polycarbonate (PC), or Polyphenylene Ether (PPE), may be used. One skilled in the art will appreciate that the type of material used may vary depending on the pressure requirements of the particular application (e.g. a properly designed PPE manifold may withstand up to several hundred psi).

A pressure sensor 140 (or multiple pressure sensors) are incorporated in the control unit, and may be exposed to the manifold (or air mattress chambers directly) via pressure taps to monitor the pressure status of the chambers. The pressure sensor 140 provides the control unit 114 with pressure information corresponding to the manifold or a respective air mattress chamber. In FIG. 1A, for example, the pressure sensor 140 is depicted as having a pressure tap 141 within the manifold 112. Other alternative environments (not depicted) may include multiple pressure taps (corresponding to one or more pressure sensors at the control unit) disposed, for example, in tubing connecting the manifold to respective chambers of the air mattress.

The control unit 114 preferably further includes a printed circuit board assembly (PCBA) with a tangible, computer-readable medium having electronically-executable instructions stored thereon (e.g. RAM, ROM, PROM, volatile, nonvolatile, or other electronic memory mechanism), and a corresponding processor for executing those instructions. The control unit 114 controls the pump 111 and the flow of gas in the airbed environment through the tubes 113, 115, and 116 by opening and closing the appropriate valves. The control unit 114 may further send and receive data to and from a user remote 130, allowing a user of the airbed environment 100 to control the pumping of the air mattress 120 through the control unit 114, as well as displaying information related to the airbed environment 100*a* to the user.

An exemplary remote 130 includes a display that indicates a current pressure status of the chambers of the air mattress 120 or a current pressure target for the chambers, and also includes input buttons that allow the user to communicate the user's desired pressure settings to the control unit 114. The user remote 130 may be connected to the control unit 114 through a wired connection as depicted, or may communicate with the control unit 114 wirelessly through appropriate communications hardware (e.g., certain implementations may include the user remote 130 being a mobile computing device running an application that wirelessly provides instructions to the control unit 114).

It will be appreciated that the airbed environment 100*a* is merely exemplary and that the principles described herein are not limited to the environment 100 depicted. For example, it will be appreciated that in an alternative embodiment, a mattress 120 with only one chamber may be used. In other embodiments, a mattress 120 with more than two chambers may be provided, with the appropriate number of connections to those mattresses. In yet another alternative embodiment, the manifold 112 may be connected directly to the pump outlet without the use of a tube 113, and in yet another alternative embodiment, the manifold 112 may be located inside the mattress 120 instead of within the control housing 110.

FIG. 1B depicts another exemplary airbed environment 100*b*. The environment 100*b* depicted in FIG. 1B is similar to the environment 100*a* depicted in FIG. 1A, as it also includes a control unit 114, a control housing 110, an air mattress 120, a user remote 130, and a pressure sensor 140 connected to a pressure tap 141 disposed within a manifold. However, in FIG. 1B, the pump and manifold are combined in an integrated housing 150, and the air mattress 120 is depicted with six chambers instead of two chambers (although it will be appreciated that both environments 100*a* and 100*b* may be adapted to accommodate a mattress with any number of chambers). Connections between the integrated housing 150 and the six chambers are shown, with one connecting tube for each chamber.

In a variation of the depicted environment 100*b*, instead of having six connecting points at the integrated housing 150 corresponding to six manifold outlets, the integrated housing 150 may have a different number, such as four outlets, to accommodate six chambers. In this embodiment, the tubes connected to two of the outlets may be divided by a splitter such that one outlet may service two chambers (e.g. chambers 1 and 3 and chambers 4 and 6 being serviced by the same outlet via a splitter). It will thus be appreciated that the integrated housing 150 of environment 100*b* and the manifold 112 of environment 100*a* may be configured with any number of outlets connected to any number of chambers within an air mattress by appropriate connections and splitters. It will further be appreciated that an integrated housing 150 or manifold 112 with, for example, six outlets may be used together with an air mattress with, for example, two chambers, as unused outlets can simply be closed. Thus, a single control housing 110 is readily adaptable for use with a variety of air mattresses.

Some other descriptions of exemplary airbed environments may be found, for example, in U.S. Pat. No. 7,886,387 and U.S. Patent Publication No. 2012/0304391, both of which are hereby incorporated by reference in their entireties.

Control Operations

In accordance with the environments depicted in FIGS. 1A and 1B, different exemplary manners of control may be implemented by the control unit 114 to direct inflate and deflate operations with respect to the air mattress 120. Three exemplary control operations with respect to inflation and deflation—(1) direct control, (2) targeted inflate/deflate or memory recall, and (3) auto-inflate (to full) or auto-deflate (to empty)—are discussed as follows, but it will be appreciated that other types of inflate and deflate control operations are possible as well.

Direct Control.

One exemplary way of controlling inflation and deflation of the air mattress is for a user to provide a continuous inflate or deflate command via the user remote 130 (e.g., by pressing and holding a corresponding button), such that the airbed system continuously inflates or deflates one or more selected chambers of an air mattress so long as the command is being given. Once the user indicates that inflation or deflation is to stop (e.g., by releasing a corresponding button), the inflation or deflation of the one or more selected chambers stops.

Targeted Inflate/Deflate or Memory Recall.

Another exemplary way of controlling inflation and deflation of an air mattress is for a user to provide a specific target pressure (e.g., as indicated by an arbitrary relative number such as a "Sleep Number," or as indicated by a particular pressure level such as an amount of psi), either by inputting the desired target pressure via the user remote 130 (targeted inflate/deflate), or by instructing the air bed system via the user remote 130 to inflate or deflate, as appropriate, to achieve a previously stored pressure level (memory recall). For memory recall, it will be appreciated that, in an example, the user can store one or more preferred settings corresponding to one or more chambers of the air mattress into the memory of the control unit, such that the user can use the user remote 130 to later recall such settings at the press of a button.

Auto-Inflate/Deflate.

Another exemplary way of controlling inflation and deflation of an air mattress is for a user simply to provide an input to inflate the air chamber to a maximum amount or to deflate the air chamber to a minimum amount. For example, the user may press a corresponding auto-inflate or auto-deflate button on the user remote 130, and the airbed system will inflate/deflate one or more selected chambers of an air mattress until entirely full/empty in response. In one exemplary implementation, the control unit may rely on a determination that a dynamically-obtained static pressure measurement (as will be discussed in further detail below) for an air mattress chamber being auto-inflated or auto-deflated has reached a threshold amount to determine when the air mattress is full (for auto-inflate) or empty (for auto-deflate). Further, as will be discussed in further detail below, for auto-inflate operations, the control unit may deliberately over-inflate the air mattress chamber (or have a relatively higher threshold amount set) to account for the effects of thermodynamic cooling.

It will be appreciated that embodiments of the invention are not limited to use in accordance with only these exemplary control operations. For example, other control operations may include sophisticated inflate/deflate routines utilized in medical applications where the control unit performs various inflate and deflate procedures with respect to different chambers of an air mattress at set times to move a patient on the air mattress as specified by the corresponding routine.

User Remote

In various embodiments of the invention, the user remote 130 may be configured in various ways and utilize different communications protocols to communicate with the control unit 114.

In a first example, the user remote 130 simply contains two buttons (one for inflate and one for deflate) and is connected to two switches of the control unit 114 via a wired connection that utilizes two supply lines connected to I/O pins on a processor of the control unit 114. Pressing a button on the remote causes a corresponding command to be carried out by the control unit 114 (e.g., closing a switch to drop one of the line voltages to zero is registered by the control unit as a command to pump or dump depending on which button is pressed).

In a second example, the user remote 130 includes more than two buttons and utilizes a wired, serial communications protocol to communicate with the control unit 114. For instance, the user remote 130 includes a Universal Asynchronous Receiver/Transmitter (UART), connected to the control unit 114 via transmit and receive lines, and communicates various codes to and from the control unit 114 to indicate the status of buttons of the user remote 130 and to receive information/indications to be presented to the user via the remote (e.g., via LEDs or a LCD display of the remote).

In a third example, the user remote 130 utilizes a wireless serial communications protocol to communicate with the control unit 114, such as Bluetooth, WiFi, infrared, or conventional radiofrequency. In this example, the control unit 114 includes a wireless module having a transceiver capable of communicating with the user remote 130 via the corresponding wireless communications protocol.

In a fourth example, the user remote 130 is a computing device suited for various uses apart from the airbed system, such as a mobile phone, tablet computer, laptop computer, or desktop computer. The computing device has an appropriate application installed thereon for providing a user interface for controlling operation of the airbed system, and has appropriate hardware for communicating with the airbed system (e.g., a wireless transceiver capable of communicating over a wireless communications protocol—such as Bluetooth, WiFi, infrared, conventional radiofrequency, or a cellular communications protocol—compatible with a wireless transceiver of the control unit).

Further, in each of these examples utilizing serial communications, the control unit 114 is further able to communicate with the user remote 130 or other computing devices to obtain remote firmware or software updates, as well as provide alternative avenues by which the airbed system can be controlled or provide performance/user data. (e.g., allowing control both through the user remote 130 and through a mobile application on a smartphone).

It will be appreciated that embodiments of the invention are not limited to the particular exemplary user remote and control unit configurations discussed above.

Calibration and Measurement

Embodiments of the invention are usable in connection with the exemplary airbed environments discussed above (as well as other airbed environments) to obtain accurate pressure readings on-the-fly (i.e., while the pump is in operation and/or while air is flowing proximate to the pressure tap for a respective pressure sensor). To provide these accurate on-the-fly pressure readings, embodiments of the invention determine a relationship between static pressure measurements taken while air is static proximate to the pressure tap for a pressure sensor and comparable dynamic pressure measurements taken while air is flowing proximate to the pressure tap, wherein the determined relationship includes calibration for the specific airbed system configuration so as to account for a large number of potential variables in the way in which the airbed system is configured. This relationship is then applied to subsequent inflate and deflate operations, and further may be updated according to pressure readings taken during such subsequent inflate and deflate operations.

The relationship between the actual static chamber pressure and a corresponding dynamic manifold pressure measurement is governed by a linear relationship:

$$SCP=M*DMP+B$$

where SCP is Static Chamber Pressure, DMP is Dynamic Manifold Pressure, and M and B are constants. Thus, for each DMP determined by a pressure sensor, a corresponding SCP can be dynamically determined based on the relationship above without actually requiring any static measurement. In other words, for a DMP value read by a pressure sensor, the corresponding SCP value can be determined as if, as soon as the DMP value is read, the pump were to be shut off with the system waiting for the pressure in the chamber and the manifold to equalize/stabilize such that the pressure sensor could then take a static chamber pressure reading.

To put it yet another way, when the airflow is static (i.e., no pumping or dumping), the M constant is 1 and the B constant is 0 such that SCP=DMP. However, while the system is inflating, each pneumatically-independent chamber of the system will have its own $M_{inflate}$ and $B_{inflate}$ constants and $M_{deflate}$ and $B_{deflate}$ constants. For example, for an airbed system with an air mattress having two chambers, the control unit of the system can be configured to determine and store the following variables: $M_{inflate1}$, $B_{inflate1}$, $M_{deflate1}$ and $B_{deflat1}$ for a first chamber, and $M_{inflate2}$, $B_{inflate2}$, $M_{deflate2}$ and $B_{deflat2}$ for a second chamber.

It will be appreciated that, while exemplary embodiments of the invention describe measurements of manifold pressure via a pressure tap in the manifold, other embodiments may take dynamic measurements from pressure tap(s) placed directly in a chamber and/or tubing going to the chamber.

Details as to how embodiments of the invention determine values for M and B with respect to each chamber so as to account for various practical application contexts will be discussed in further detail below. Each practical application for an airbed system, even if it uses the same pump and/or the same type of air mattress, involves many variables that cause each implementation to be unique. For example, practical variables in the environment and the system that need to be accounted for in calibrating the relationship between SCP and DMP for each chamber includes the impact of differences in mattress, pump, tubing and valve construction and configuration (for example, variances attributable to pump output variation, molding flash or glue in any flow path, variability of solenoid retraction, asymmetric location of the pressure transducer port in the manifold, length of tubing connection between manifold and chamber, use of air hold quick disconnects versus simple double barb fittings, internal flow resistance of chamber zones, and/or irregularities in flow geometry such as a kink in the tubing). Further, this system-based calibration (using M and B constants) allow for changes in the system configuration over time (e.g., due to wear and tear of the air mattress construction or certain elements of the pump, or other changes in shape and/or configuration of components of the air mattress and/or pumping system) to be accounted for as well.

Particular implementations of embodiments of the invention have been demonstrated as being able to accurately measure and display static pressure corresponding an air chamber during pump operation, and to automatically calibrate the measurement system to allow for accuracy of +/−0.01 psi. Thus, embodiments of the invention provide for highly accurate measurement (and display, if desired) of what the "static" pressure of an air mattress chamber is while air is still flowing proximate to the pressure sensor—i.e., even though a true "static" pressure reading is not possible while air is flowing, the static chamber pressure can still be dynamically obtained. This allows for inflation and deflation operations to be performed in an airbed system with the benefit of an accurately monitored pressure within an air mattress chamber being operated upon without the noise and delay associated with conventional stop-and-check measurement systems. As such, embodiments of the invention are both faster and quieter, as well as more accurate, than conventional systems, and may be particularly suitable for medical applications requiring very accurate pressure control (e.g., tolerances of ±0.01 psi). Additionally, the embodiments of the invention are able to achieve the advantages of being fast, quiet, and accurate while using relatively inexpensive hardware for pressure sensing (e.g., low-cost pressure transducers).

Particularly for embodiments of the invention using low-cost pressure transducers, two calibration processes are performed to determine the M and B values discussed above. An "Offset Calibration" is performed to calibrate the airbed system and pressure sensors with respect to current environmental conditions (e.g., with respect to temperature and atmospheric pressure). A "System Calibration" is also performed to calibrate the system and pressure sensors with respect to the specific configuration of the physical components of the entire system. It will be appreciated that these two calibration processes may be performed separately or together, and may have different triggering conditions (e.g., in response to the airbed system being turned on, in response to a user command to calibrate, in response to detection of certain conditions, etc.). In one example, the System Calibration is performed in response to only the first time the pumping system is turned on and/or in response to a specific request for System Calibration from a user, while the Offset Calibration is performed prior to each System Calibration procedure, each time the pumping system is powered on, each time the user remote wakes up (e.g., goes from a dark state to a lit-up state), each time an on-demand calibration procedure is requested, each time a control operation (e.g., deflate/inflate) is initiated for any air chamber, and/or in response to a specific request for Offset Calibration from a user. It will further be appreciated that, in these embodiments, the System Calibration utilizes gage pressure based on the offset measurement determined according to the Offset Calibration.

Offset Calibration

Low-cost pressure transducers are generally not calibrated to compensate for excursions of temperature or changes in atmospheric pressure, but both of these factors can significantly impact the values read by a pressure transducer. Accordingly, for embodiments of the invention using low-cost pressure transducers that are not calibrated for temperature and atmospheric pressure, the airbed system utilizes gage pressure readings instead of absolute pressure readings, by determining, via the Offset Calibration, an initial atmospheric reading and deducting that initial atmospheric reading (i.e., the "offset") from all subsequent pressure readings. This allows the airbed system to adapt itself to various environments and, for example, to account for differences between the location of manufacture and the location of use (e.g., in the case of an airbed system being initially manufactured at a low altitude and then shipped to a region of high altitude for use).

Figure 2:
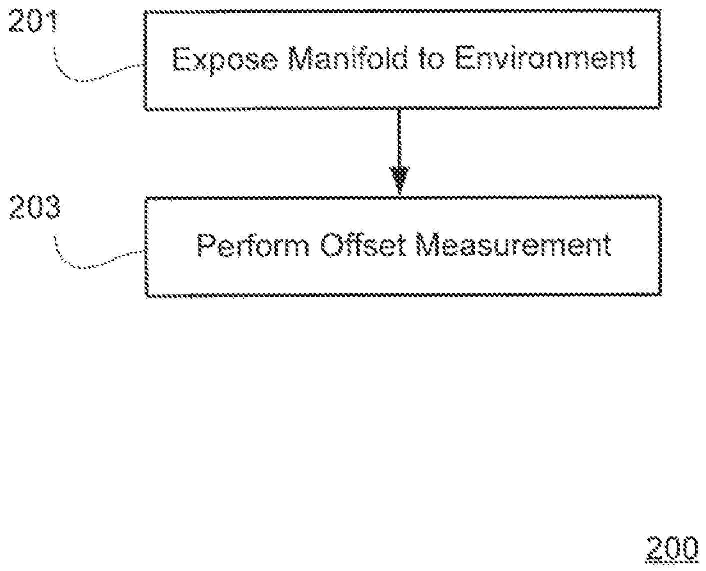
FIG. 2 is flowchart illustrating offset calibration according to an embodiment of the described principles.

FIG. 2 is a flowchart 200 illustrating an exemplary process for performing the Offset Calibration. At stage 201, the manifold is isolated from the air mattress chambers (e.g., by closing all the chamber solenoids) and exposed to the atmospheric environment surrounding the airbed system (e.g., by opening a drain/exhaust solenoid). This exposes the pressure transducer within the manifold to the current atmospheric pressure and temperature. An offset measurement is then taken at stage 203, which can be used by the airbed system to determine gage/delta pressure readings instead of absolute pressure readings (i.e., by deducting the offset measurement from subsequent pressure readings obtained by the pressure sensor). Specifically, in an example, obtaining the offset measurement may include passing a pressure transducer voltage through a hardware filter (e.g., corresponding to a time period of ~23 ms), using an analog-to-digital converter to obtain a digital signal corresponding to the hardware-filtered voltage, and then applying a two-pole software filter to the digital signal to obtain the offset measurement.

It is generally a safe assumption that atmospheric pressure and temperature will not significantly change during the course of a particular pressure adjustment operation. Thus, an offset measurement taken at the beginning of each inflate or deflate operation will allow gage pressure to be determined with a high degree of accuracy. Even if the offset measurement is taken less often—for example, only when the pumping system is powered on or woken from a sleep state—the offset measurement would generally still provide an accurate reference for determining gage pressure.

System Calibration

Embodiments of the invention provide different ways of calibrating pressure measurements of an airbed system for inflate and deflate operations.

Figure 3A:
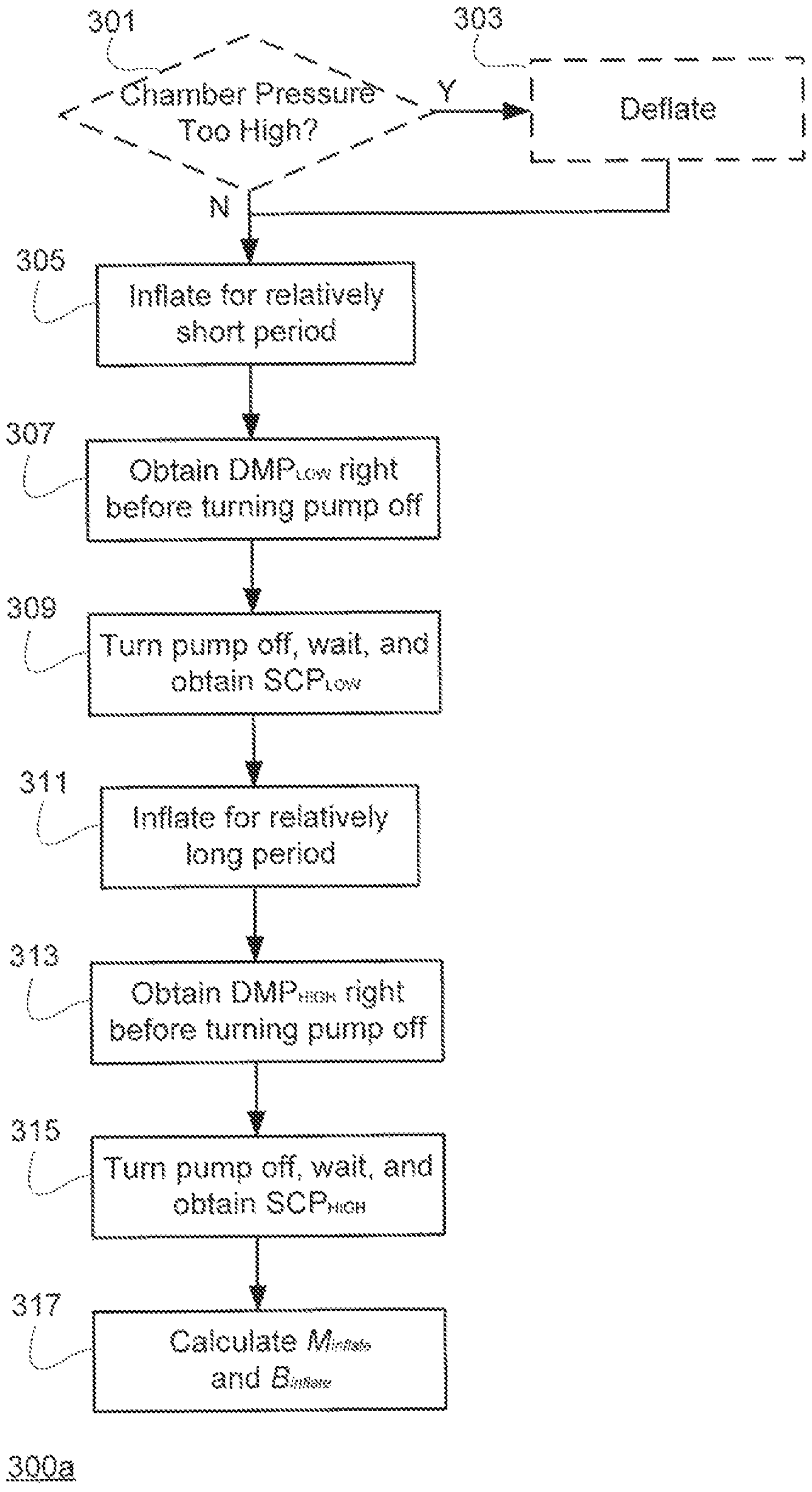
FIGS. 3A and 3B are flowcharts illustrating calibration processes according to embodiments of the described principles.
Figure 3B:
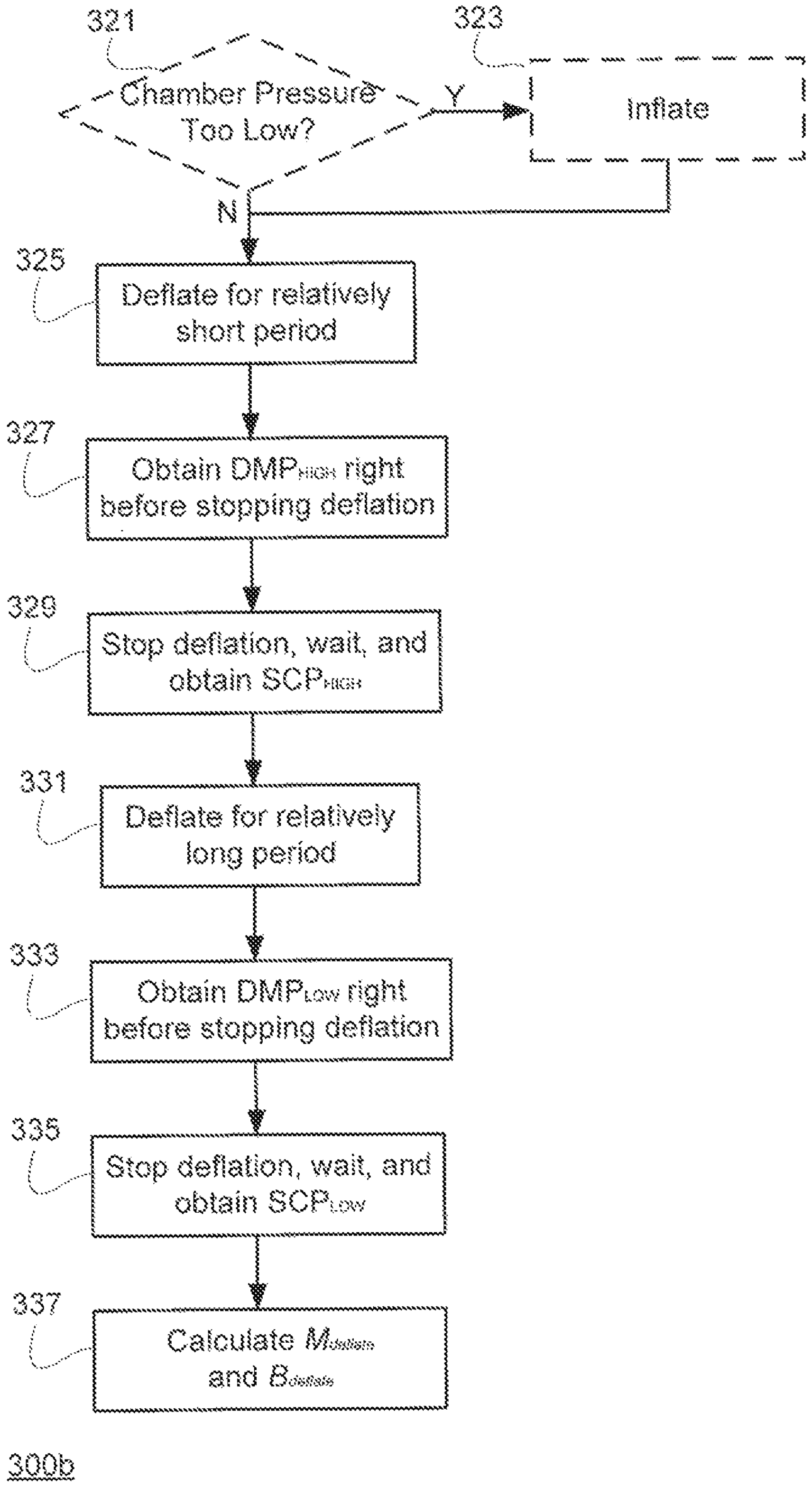

FIGS. 3A and 3B are flowcharts illustrating a dedicated system calibration procedure to determine M and B values for inflation and deflation, respectively. The calibration procedures depicted in FIGS. 3A and 3B may be, for example, initiated in response to a user command to perform calibration and/or automatically in response to the airbed system powering on. In one exemplary implementation, the system calibration procedures are only performed in response to a specific user command for calibration (e.g., to prevent unwanted calibrations from being performed in situations such as power outages). The command for calibration may be directed to calibrating all of the chambers for both inflate and deflate operations—or, alternatively, may be directed to calibrating a specific chamber and/or for a specific operation (e.g., just inflate or just deflate).

The flowchart 300*a* of FIG. 3A illustrates a process for calibration of a specific chamber that determines M and B values for that chamber corresponding to inflation by the airbed pumping system.

At stage 301, the control unit of the system performs a static measurement (i.e., a measurement where the pressure tap is in fluid communication with the air chamber(s) to be measured while being isolated from other chambers and from the external environment, and while air is not flowing proximate to the pressure tap) to determine whether the pressure in the chamber is too high to perform inflation calibration (if the chamber is already at or near a maximum pressure, the calibration procedure will be less accurate). In response to determining that the chamber is above a threshold pressure at stage 301, the system deflates the chamber for a period of time at stage 303 to bring the chamber down to an appropriate pressure for starting the inflate calibration procedure. It will be appreciated that stage 301 (and stage 303) need not be performed, for example, if the static pressure of the air mattress is already known to be low enough to perform the inflate calibration procedure (for example, when an inflate calibration procedure for the chamber is performed immediately after a deflate calibration procedure for that chamber).

At stage 305, the pump is then turned on to inflate the air mattress chamber for a relatively short period of time (e.g., 1 second). At stage 307, right before turning the pump off, a pressure measurement is saved as a $DMP_{LOW}$ value. At stage 309, the pump is turned off, a short time (e.g., 1 second) is allowed to elapse for the pressure within the manifold to equalize with the pressure in the chamber, and then a pressure measurement taken after the elapsed time is saved as a $SCP_{LOW}$ value corresponding to the $DMP_{LOW}$ value.

The pump is then turned on to inflate the air mattress for a relatively long period of time at stage 311. The period of time that would be sufficient varies depending on the size of the chamber, but does not need to be precise (one way to determine when to stop the inflate is to set a pressure target near the top of an expected pressure range; alternatively, a time period of, for example, 2 minutes could be set). Measurements are taken to obtain $DMP_{HIGH}$ and $SCP_{HIGH}$ values (i.e., by saving a pressure measurement taken right before the pump is turned off again as $DMP_{HIGH}$ at stage 313, and then turning off the pump waiting for an elapsed time, and saving a pressure measurement taken after the elapsed time as $SCP_{HIGH}$ at stage 315).

Then, at stage 317, $M_{inflate}$ and $B_{inflate}$ for that chamber are determined based on the data pairs $DMP_{LOW}$ with $SCP_{LOW}$ and $DMP_{HIGH}$ with $SCP_{HIGH}$. Specifically, in an example, the control unit determines $M_{inflate}$ and $B_{inflate}$ according to the following:

$$M_{inflate}=(SCP_{HIGH}-SCP_{LOW})/(DMP_{HIGH}-DMP_{LOW});$$

$$B_{inflate}=SCP_{HIGH}-(M_{inflate}*DMP_{HIGH})$$

$$\text{[or alternatively, } B_{inflate}=SCP_{LOW}-(M_{inflate}*DMP_{LOW})].$$

The flowchart 300*b* of FIG. 3B illustrates a process for calibration of a specific chamber that determines M and B values for that chamber corresponding to deflation by the airbed pumping system.

At stage 321, the control unit of the system checks performs a static measurement to determine whether the pressure in the chamber is too low to perform deflation calibration (e.g., if the chamber is already at or near a minimum pressure, the calibration procedure will be less accurate). In response to determining that the chamber is above a threshold pressure at stage 321, the system inflates the chamber for a period of time at stage 323 to bring the chamber up to an appropriate pressure for starting the inflate calibration procedure. It will be appreciated that stage 321 (and stage 323) need not be performed, for example, if the static pressure of the air mattress is already known to be high enough to perform the deflate calibration procedure (for example, when a deflate calibration procedure for the chamber is performed immediately after an inflate calibration procedure for that chamber).

At stage 325, the air mattress chamber is then deflated (e.g., by exposing the chamber to an exhaust via the manifold and/or by dumping the air from the chamber using the pump) for a relatively short period of time (e.g., 1 sec). At stage 327, right before stopping the deflation, a pressure measurement taken while the air is flowing is saved as a $DMP_{HIGH}$ value. At stage 329, the deflation is stopped, a short time (e.g., 1 sec) is allowed to elapse for the pressure within the manifold to equalize with the pressure in the chamber, and then a static pressure measurement taken after the elapsed time is saved as a $SCP_{HIGH}$ value corresponding to the $DMP_{HIGH}$ value.

The deflation is then continued for a relatively long period of time at stage 331, and measurements are taken to obtain $DMP_{LOW}$ and $SCP_{LOW}$ values (i.e., by saving a pressure measurement taken right before the deflation is stopped off again as $DMP_{LOW}$ at stage 333, and then stopping the deflation, waiting for an elapsed time, and saving a pressure measurement taken after the elapsed time as $SCP_{LOW}$ at stage 335).

Then, at stage 337, $M_{deflate}$ and $B_{deflate}$ for that chamber are determined based on the data pairs $DMP_{LOW}$ with $SCP_{LOW}$ and $DMP_{HIGH}$ with $SCP_{HIGH}$. Specifically, the control unit determines $M_{deflate}$ and $B_{deflate}$ according to the following:

$$M_{deflate}=(SCP_{HIGH}-SCP_{LOW})/(DMP_{HIGH}-DMP_{LOW});$$

$$B_{deflate}=SCP_{HIGH}-(M_{deflate}*DMP_{HIGH})$$

$$\text{[or alternatively, } B_{deflate}=SCP_{LOW}-(M_{deflate}*DMP_{LOW})].$$

It will be appreciated that the calibration processes shown in FIGS. 3A and 3B can be executed and repeated for all chambers of an air mattress in any order to determine a complete calibration for all of the chambers, and/or can be individually performed for particular chambers one at a time on an on-demand basis.

It will further be appreciated that the SCP and DMP values discussed above, as utilized by the system, may be values that are representative of pressure (and that can be converted to units of pressure by the control unit if desired), but need not be expressed directly in terms of a pressure unit such as psi. Further, for example, in an exemplary implementation using a non-floating point processor in the control unit, SCP and DMP values may be multiplied by 256 to put the calculations performed by the processor in the range of integer math. Thus, it will be appreciated that the particular units of measurement and numerical range for the SCP and DMP values are not important so long as those values are representative of pressure.

It will be appreciated that FIGS. 3A and 3B can be performed together (e.g., one after another) as part of a single calibration procedure and may, for example, be requested on demand or be based upon some other trigger (e.g., detecting that the pumping system is powered on for the first time with respect to a new air mattress chamber configuration). In further exemplary implementations, the calibration procedure(s) are part of a comprehensive self-test of the airbed system, for example, including but not limited to checking solenoid actuation, manifold pressure integrity, pressure tube connection integrity, motor operation, firmware, main PCBA, integrity of the motor/pump-to-manifold tube connections, drain solenoid and drain port, wireless connection with the user remote, etc. During a self-test test, errors that are found may be indicated on the user remote (or via the display of another user interface in communication with the pumping system).

Figure 4:
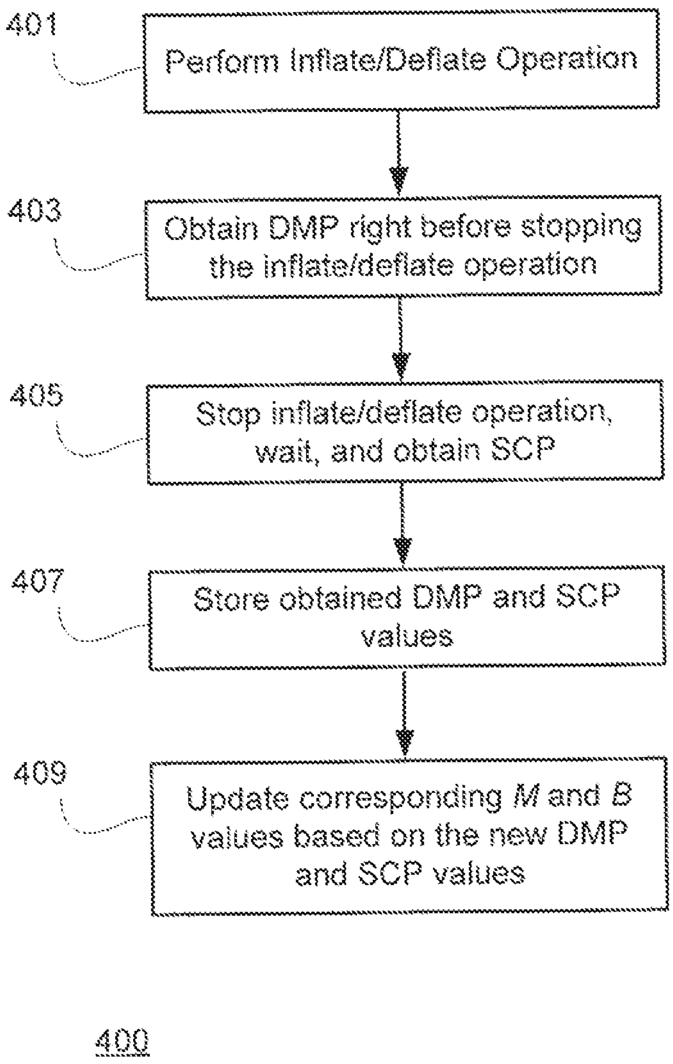
FIG. 4 is a flowchart illustrating an on-the-fly calibration process (or "learning algorithm") according to an embodiment of the described principles.

While FIGS. 3A and 3B illustrate exemplary embodiments of "dedicated" calibration procedures aimed at determining M and B values for a particular system configuration, other exemplary embodiments of the invention include on-the-fly, "dynamic" calibration that is able to "learn" and/or update the M and B values for a particular system configuration simultaneously with actual inflate and deflate operations requested by a user during practical use of the airbed system by the user. FIG. 4 includes a flowchart illustrating an exemplary process 400 where, for each chamber, a number of data pairs for SCP and DMP are updated based on new data pairs determined from actual use of the airbed system to update M and B values on the fly.

As a starting point, the airbed system may be preprogrammed with default M and B values (e.g., for particular chambers) and/or DMP-SCP data pairs. Or, if not preprogrammed with default values and/or data pairs, initial M and B values can be determined via a dedicated calibration procedure as discussed above with respect to FIGS. 3A and 3B). These default and/or initial M and B values can then be updated on-the-fly according to the process 400 depicted in FIG. 4. It will be appreciated that, if default M and B values are used, they may start off as being slightly or somewhat inaccurate for a particular air mattress configuration. However, once the M and B values are updated, e.g. via a dedicated calibration procedure (e.g., FIGS. 3A and 3B) or on-the-fly according to the process 400, dynamically-obtained static chamber pressure measurements may be accurate, for example, within +/−0.01 psi.

The process 400 begins at stage 401 with the airbed system performing an inflation or deflation operation. This inflation or deflation operation may be, for example, based on a user actually using the airbed system to inflate or deflate an air mattress chamber as desired. At stage 403, right before the inflation or deflation operation is stopped (e.g., in response to the user letting go of an inflate or deflate button, or the control unit determining that an auto-inflate/deflate or memory recall operation is about to end), a pressure reading from a pressure sensor in the manifold is determined to be a DMP value. At stage 405, an SCP value corresponding to that DMP value is obtained by stopping the inflate or deflate operation, waiting for a period of time for the pressure within the manifold and chamber to stabilize, and again taking a pressure reading from the pressure sensor.

At stage 407, the obtained SCP and DMP values are stored by the control unit as corresponding to a pneumatically-independent chamber (or a pneumatically-independent set of chambers, such as when two chambers—e.g., Head/Foot—are pneumatically joined so as to be controlled together) and as corresponding to inflation or deflation, as appropriate based on the operation that was performed. In certain exemplary embodiments the SCP and DMP values may be stored in addition to other values, while in other exemplary embodiments, the SCP and DMP values are used to overwrite previously stored values. Different examples will be discussed in further detail below. At stage 409, the M and B values corresponding to the chamber (or set of chambers) and inflation or deflation are then updated by the control unit based on the additional SCP and DMP data pair. The updated M and B values can then be applied to future operations of the airbed system for accurately determining pressure in the corresponding chamber during a corresponding inflation/deflation operation while air is not static at the pressure sensor. These updated M and B values may also be further updated based on such future operations according to subsequent iterations of the process 400.

In one example, the control unit only stores two data pairs for calculating each M and B value for a chamber and for inflation. Thus, for an exemplary Chamber 1 of an air mattress, the Chamber 1 stores $DMP_{HIGHinflate1}$, $SCPH_{HIGHinflate1}$, $DMP_{LOWinflate1}$ and $SCP_{LOWinflate1}$ upon which $M_{inflate1}$ and $B_{inflate1}$ are based, and $DMP_{HIGHdeflate1}$, $SCP_{HIGHdeflate1}$, $DMP_{LOWdeflate1}$ and $SCP_{LOWdeflate1}$ upon which $M_{deflate1}$ and $B_{deflate1}$ are based. Thus, as discussed above with respect to FIG. 4, each time an actual inflate or deflate operation is performed with respect to Chamber 1, an appropriate DMP-SCP data pair can be updated. The data pair that is to be updated can be determined based on the operation that was performed (inflate or deflate) and the value of one of the measurements (e.g., the SCP measurement). For example, the control unit may consider SCP values less than 0.44 psi to be suitable for a SCPLOW data point, and utilize DMP-SCP data pairs with an SCP value of less than 0.44 psi as low-side data pairs while DMP-SCP data pairs with an SCP value of greater than or equal to 0.44 psi are used as high-side data pairs.

The foregoing example is a relatively simple example, but may not be ideal since it may result in a DMP-SCP high-side data pair that is very close to a DMP-SCP low-side data pair (e.g., when the $SCP_{LOW}$ value is 0.42 psi and the $SCP_{HIGH}$ value is 0.44 psi). In another example, this situation is avoided by the use of four data pairs per chamber (e.g., a Chamber 1) per operation (i.e., inflate or deflate). In this example, four categories of DMP-SCP data pairs are defined for each chamber (or set of chambers) for each operation: LOW (e.g., from 0.10 to 0.26 psi), MID-LOW (e.g., from 0.27 to 0.43 psi), MID-HIGH (e.g., from 0.44 to 0.59 psi), and HIGH (e.g., from 0.60 to 0.75 psi). Thus, when the process 400 discussed above with respect to FIG. 4 is performed, at stage 407, each DMP-SCP data pair that is obtained that falls in one of these categories is stored/updated as the DMP-SCP data pair for that category (and for the associated chamber and operation). At stage 409, M and B are updated based on the newly obtained data pair in combination with a second data pair, where the second data pair is selected to be at least one step removed from the newly obtained data pair. Thus, for example, if the new data pair is in the LOW range, the other data pair used for calculating M and B is either a MID-HIGH data pair or a HIGH data pair (but not a MID-LOW data pair); and if the new data pair is in the MID-LOW range, the other data pair used for calculating M and B is a HIGH data pair (but not a LOW data pair or MID-HIGH data pair).

As discussed above, it will be appreciated that the actual DMP and SCP values utilized in the system may not actually be in psi units, but rather in an arbitrary form and in an arbitrary range that are representative of what actual DMP and SCP measurements in pressure units would be. Further, it will be appreciated that, the particular values that constitute the LOW and HIGH ranges, or LOW, MID-LOW, MID-HIGH and HIGH ranges, or other ranges, may vary from implementation to implementation, for example, depending on various parameters of the system.

Other examples are also possible and are implemented by various embodiments of the invention as well. For example, the control unit may include a large number of fine-grained ranges for DMP-SCP data pairs and rely on more than just two data pairs for calculating M and B (for example, a linear regression function to determine best-fit values for M and B). In yet another example, the control unit may store a large number of data pairs for each chamber/operation, including all previously collected data pairs. Or, to the extent memory space is a constraint or due to the concern of old data pairs providing data points that are no longer applicable, the control unit may delete old data pairs on the basis of time expiration or on the basis of a total max limit of data pairs being exceeded (e.g., by deleting the oldest data pair and adding in a newly obtained data pair).

It will be appreciated that, for exemplary embodiments of the invention involving a low-cost pressure transducer for performing the pressure readings, all of the SCP and DMP measurements referred to above in the context of FIGS. 3A, 3B and 4 have the offset measurement (determined according to the Offset Calibration procedure discussed above) already applied to them, such that the M and B values are determined based on gage pressure rather than absolute pressure.

Latency Qualification

It will further be appreciated that the SCP and DMP measurements referred to above in the context of FIGS. 3A, 3B and 4 may be based on a "filtered" voltage corresponding to voltages read by the pressure sensor over a period of time (e.g., the average over ~0.5 seconds), and not the instantaneous voltage read by the pressure sensor, as will be discussed in further detail below.

Pressure readings taken by a pressure sensor in an airbed system may be subject to certain types of noise or disturbances. For example, for an airbed system using a diaphragm pump, two types of pressure waves may be detected by the pressure sensor. The first are the higher-frequency, steady-amplitude waves coming out of a diaphragm pump during pumping actions. The second is a longer period where decreasing amplitude waves occur after a sudden change in pressure when a valve (e.g., a solenoid) is actuated or the pump turns on or off.

Figure 5A:
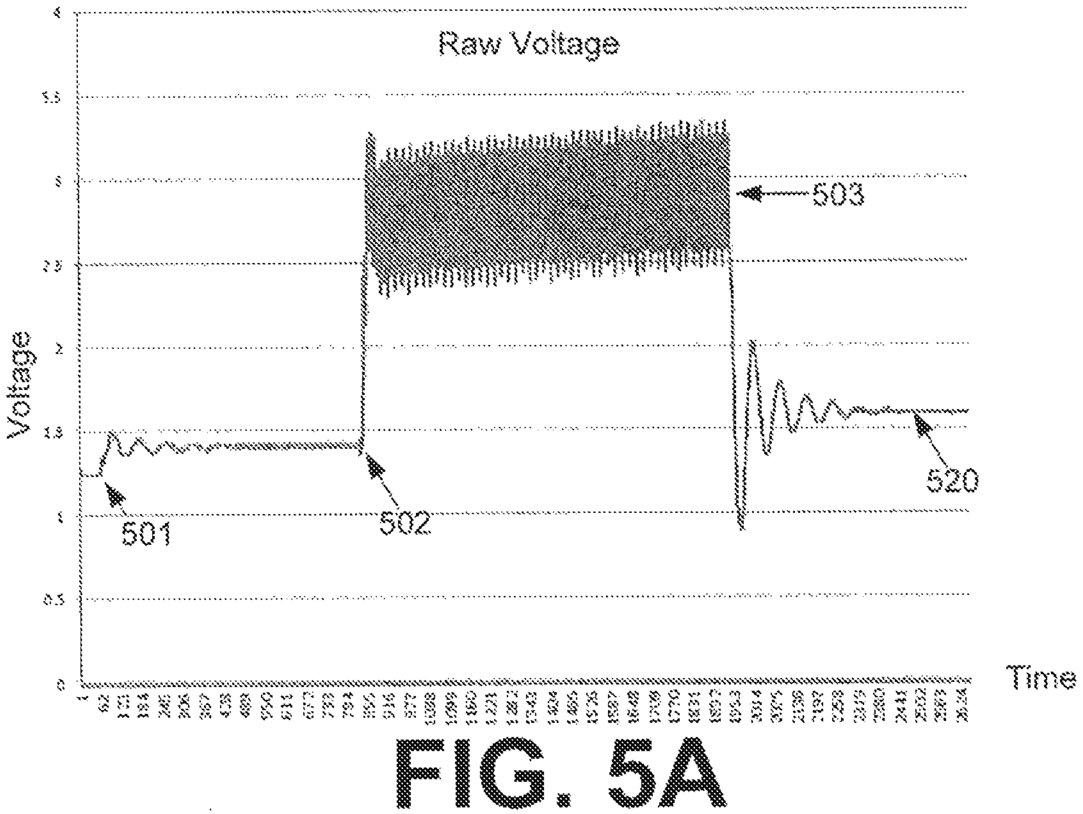
FIGS. 5A and 5B are exemplary graphs illustrating pressure measurements taken during exemplary calibration processes.

FIG. 5A provides an exemplary plot of pressure readings taken over time throughout an inflation procedure, showing raw voltage read by the pressure sensor over time. Before the point 501, the manifold is exposed to the external environment through an exhaust valve for determining an offset voltage value via offset calibration as discussed above. At stage 501, the manifold is isolated from the external environment and a chamber valve (e.g., a solenoid) is opened to connect the manifold to the air mattress chamber that is to be inflated. This creates a pressure wave of decreasing-amplitude detected by the pressure sensor. At stage 502, the pump is turned on to inflate the air mattress chamber. While the pump is on, higher-frequency, steady-amplitude waves are generated by the diaphragm pump due to the pumping action of the pump. At stage 503, the pump is turned off, again resulting in another pressure wave of decreasing-amplitude.

Figure 5B:
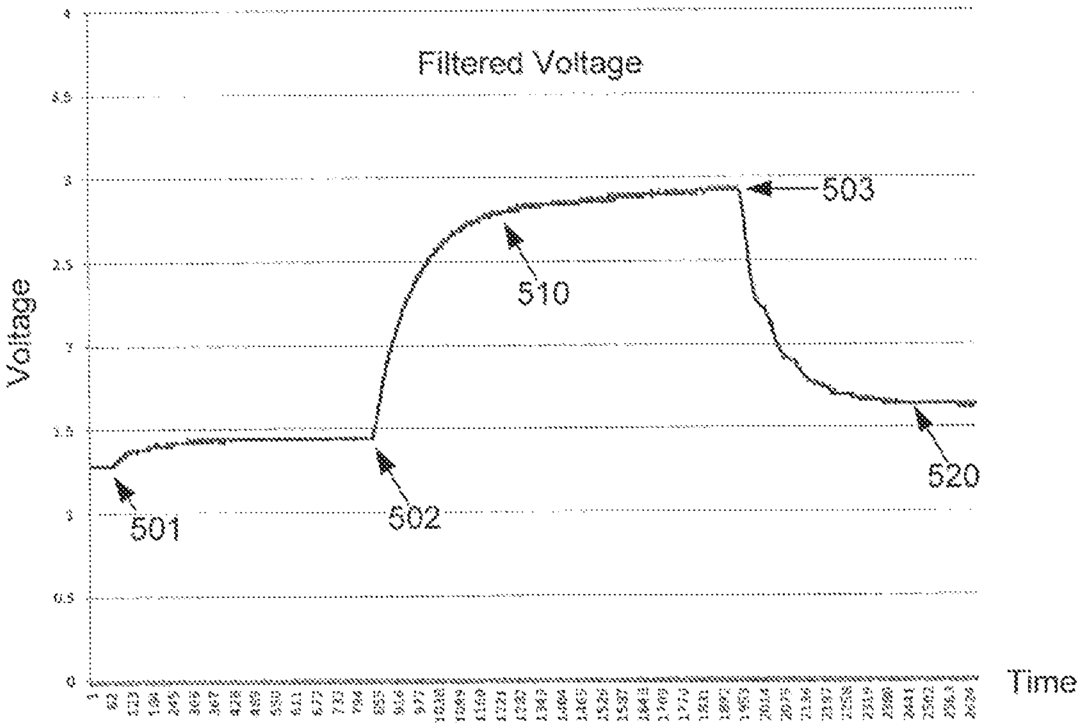

Embodiments of the invention account for the existence of these pressure waves by utilizing a filtered voltage measurement instead of the instantaneous raw voltage read by the pressure sensor. This is accomplished, for example, by passing the raw voltage detected by a pressure transducer through a single-pole, low-pass hardware filter, performing an analog-to-digital conversion using an A/D converter, and passing the digital signal through a two-pole software filter to obtain an average value for voltage over a previous period of time (e.g., ~0.5 seconds). FIG. 5B is a plot of filtered voltage versus time corresponding to the raw voltage measurements shown in FIG. 5A. As can be seen in FIG. 5B, applying the voltage filter provides a steady measurement that is able to achieve an accurate reading ~0.5 seconds after a noise/disturbance-producing event occurs. For example, after the pump is turned on at stage 502, the filtered voltage reading takes about 0.5 seconds to catch up at stage 510, and after it catches up at stage 510, the filtered voltage reading can be used as an accurate representation of dynamically-measured pressure for the manifold.

On the other hand, for the decreasing-amplitude wave that occurs after the pump is turned off at stage 503 (see FIG. 5A), after a sufficiently long amount of time has elapsed for the pressure to stabilize, either the instantaneous raw voltage or the filtered voltage can be used to determine static chamber pressure at stage 520, since there is no ongoing disturbance in the pressure. It will be appreciated, however, that it is still preferable to use the filtered voltage at stage 520, to provide a similar basis of comparison with respect to measurements taken while the pump is on, as well as to avoid potential noise in the pressure reading from other sources.

Further, the offset measurement obtained from the offset calibration process can be deducted from the filtered voltage measurement to obtain the "pressure" that is used as SCP or DMP values for the M and B calculations discussed above. Further conversion of the SCP and DMP values into units of pressure may be performed if desired (e.g., for display purposes or for control-related purposes).

While the foregoing examples are illustrative of pressure waves introduced by a diaphragm pump, it will be appreciated that other types of pumps may be used as well, such as squirrel-cage blower-type pumps and boundary-layer technology-based pumps. It will be appreciated that for different types of pumps, the particular latency period that is suitable for each type of pump may vary a bit in duration.

In further embodiments of the invention, the consideration of this latency period for arriving at accurate dynamic measurements during pump operation may also be used to impose a condition upon when the control unit will attempt to update a DMP-SCP data pair in embodiments of the invention relating to FIG. 4. For example, the control unit may only perform stages 407 and 409 of FIG. 4 after verifying that the inflation or deflation operation exceeds the latency period. This ensures that a new DMP-SCP data pair will not be subject to noise-related fluctuations.

Exemplary Inflate and Deflate Operations

Figure 6:
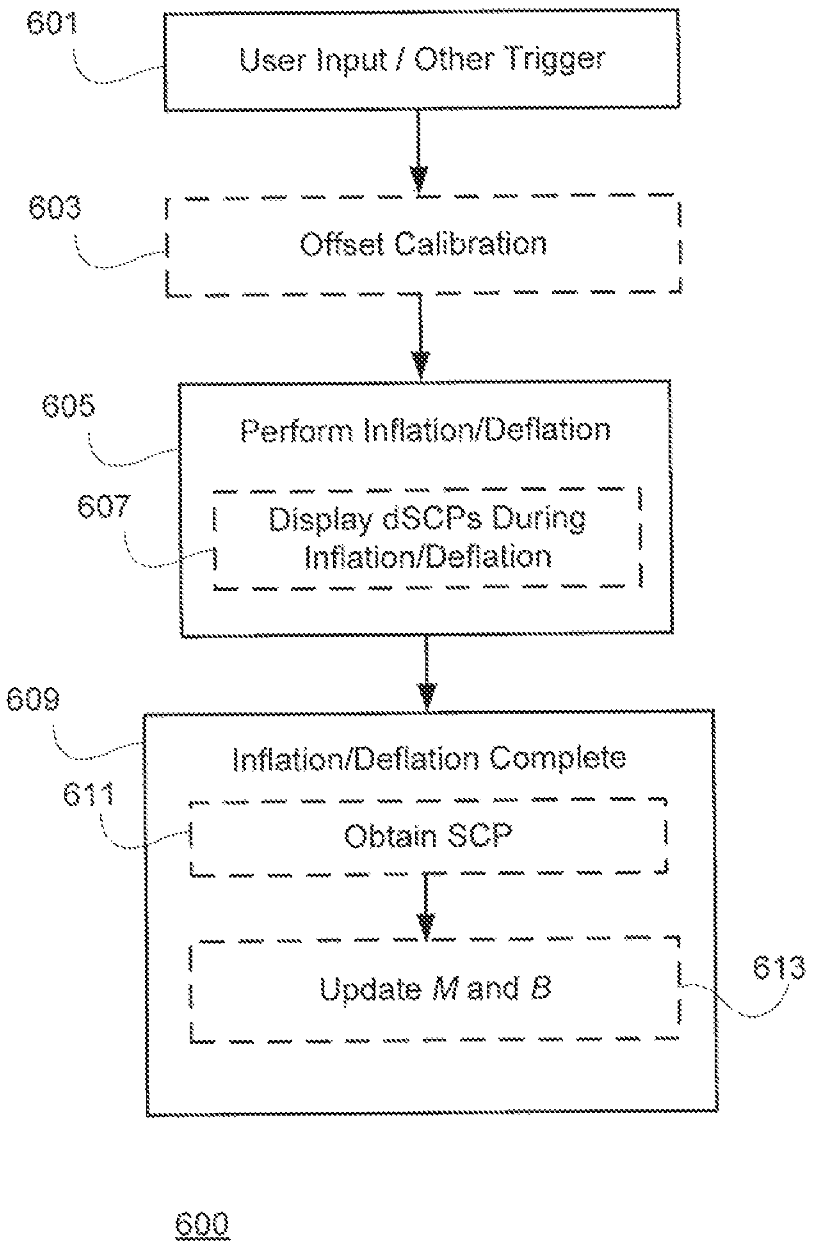
FIG. 6 is a flowchart illustrating an exemplary inflate or deflate operation utilizing embodiments of the described principles.

Based upon the M and B values corresponding to each chamber of an air mattress system as determined via embodiments of the invention, various inflate and deflate control operations may be performed that utilize the dynamically-determined SCP measurements to provide accurate feedback to a user and accurate control of the system. FIG. 6 illustrates an exemplary process 600 where inflation or deflation is performed by an airbed system.

At stage 601, the control unit of the airbed system determines that an inflation or deflation operation is to be performed, for example, in response to a user input on a user remote or in response to some other trigger (such as a time-based, programmed routine). At stage 603, an offset calibration may be performed, for example with respect to embodiments involving low-cost pressure transducers, to ensure that all readings taken in connection with the inflation/deflation operation can be accurately adjusting into gage pressure measurements.

At stage 605, the inflation or deflation operation is performed, and while the inflation or deflation operation is ongoing, a dynamically-obtained static chamber pressure (dSCP) can be presented on a display of a user remote used to control the airbed system (or on some other display, such as on a computer) at stage 607. In an exemplary implementation, dSCP values are displayed in a scrolling manner, such that, for example, when a user holds down an inflate or deflate button, the dSCP values scroll upwards or downwards in accordance with the inflation or deflation of the air mattress. Embodiments of the invention are able to achieve displayed dSCP values that are accurate relative to the actual corresponding SCP values in the chamber (as would be measured at the respective times) within +/−0.01 psi.

At stage 609, the airbed system stops inflation or deflation, for example, based on user input (e.g., the user letting go of the inflate or deflate button), based on a target pressure being reached (as determined according to the dSCP values calculated by the control unit), or other conditions. Once the inflate or deflate operation is stopped and a sufficient stabilization period has elapsed, the control unit can then determine the actual SCP value corresponding to the chamber under static conditions at stage 611. The actual measured SCP value can then be displayed to the user (e.g., on the user remote or some other computing device). The SCP value, in combination with a corresponding DMP value obtained right before stopping the inflate or deflate operation, can also be used to update M and B values at stage 613 (as discussed above with respect to FIG. 4).

Figure 7:
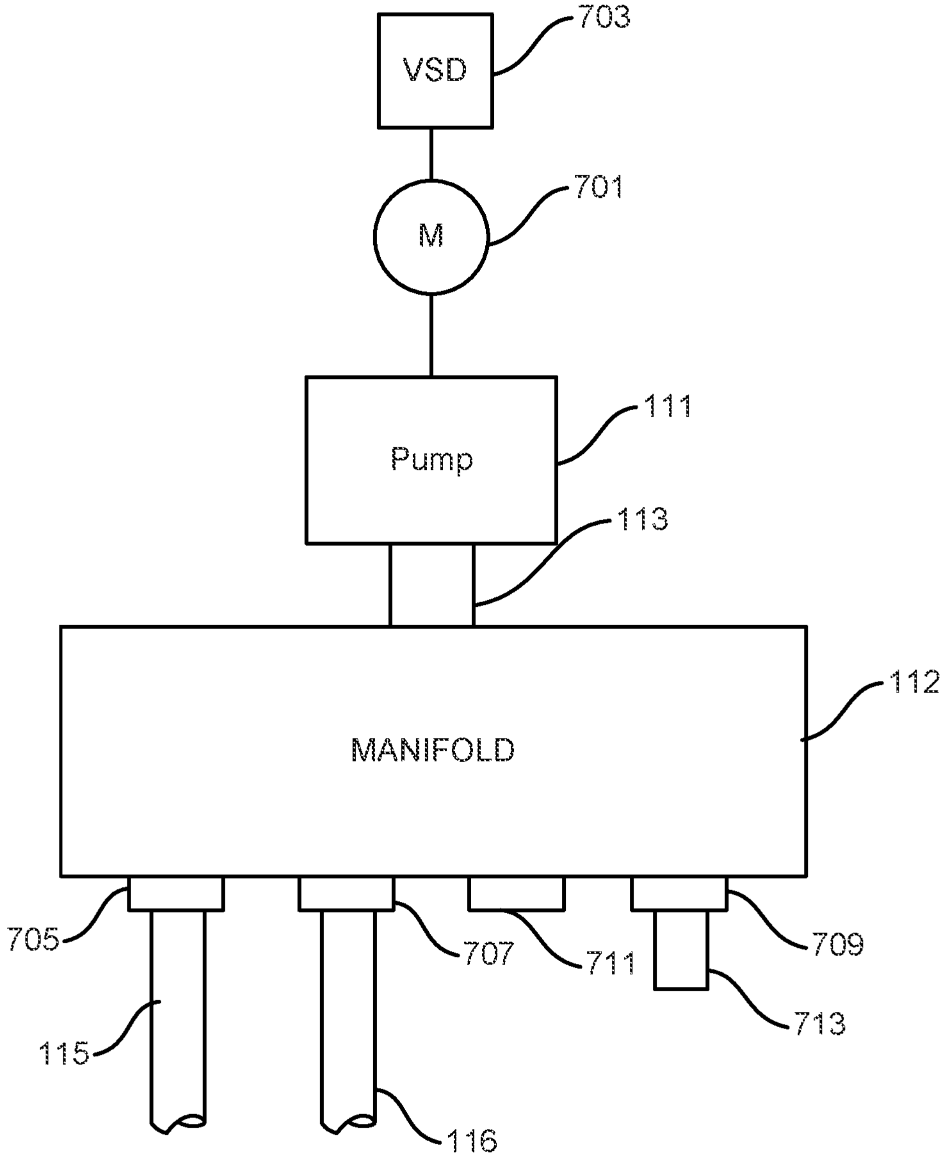
FIG. 7 is a block diagram of a manifold and pump configuration according to an embodiment of the described principles.

Referring to FIG. 7, in another embodiment of the invention, the pump 111 is driven by a motor 701 having a variable speed drive 703. The variable speed drive 703 is configured to control the speed of the motor 701 and the inflation output of the pump 111. In another embodiment of the described principles, the pump 111 comprises a self-contained diaphragm air pump (not shown) having electromagnets configured to drive a piston in order to control the inflation output. In some embodiments of the described principles, the inflation output may be controlled by adjusting at least one of (1) a maximum current applied to the pump/motor, (2) a voltage applied to the pump/motor, (3) a frequency of the pump/motor, or (4) a waveform of an applied voltage to the pump/motor. The waveform corresponding to an acoustical profile of the pump/motor. The waveform may comprise one of a sine waveform or a square waveform. Other types of waveforms may be utilized depending on the acoustical profile of the pump/motor. The variable speed drive 703 may operate in a mode of operation corresponding to a predetermined motor speed. For example, the variable speed drive 703 may operate in a normal mode corresponding to a first predetermined motor speed, a quiet mode associated to a second predetermined motor speed, or a very quiet mode corresponding to a third predetermined motor speed. In an embodiment of the invention, the first predetermined motor speed is greater than the second predetermined motor speed, and the second predetermined motor speed is greater than the third predetermined motor speed. For each mode of operation (e.g., normal, quiet, and very quiet), the values for a first constant $M_{mode}$ and a second constant $B_{mode}$ may be determined using the system calibration procedures described herein (e.g., FIGS. 3A and 3B). It is appreciated that additional modes of operation may be programmed to correspond to distinct predetermined motor speeds.

The manifold 112 comprises inflate ports 705 and 707 that correspond to chamber A 121 and chamber B 122 respectively. The manifold 112 further comprises a first stage exhaust port 709 having a first head loss coefficient $K_1$, and a second stage exhaust port 711 having a second head loss coefficient $K_2$. The first stage exhaust port 709 and the second stage exhaust port 711 are each configured to be in pneumatic communication with the chambers A 121 and B 122, either individually or in combination, during deflation of the air mattress chamber. Exhaust ports 709 and 711 are each configured, during a deflate operation, to control an exhaust from chamber A 121, chamber B 122, or both. In some embodiments of the invention, the first head loss coefficient $K_1$ is greater than the second head loss coefficient $K_2$ in order to create additional head loss through the first stage exhaust port 709 during a deflate operation. In other embodiments of the invention, a flow restrictor 713 is connected to the first stage exhaust port 709 in order create additional head loss through the first stage exhaust port 709 during a deflate operation.

In an embodiment of the described principals, the airbed system is configured to actuate an isolation valve (not shown) in order to isolate chamber A 121 from the manifold 112 and pneumatically connect a second pressure sensor (not shown) to chamber A 121; wherein the second pressure sensor is connected to the tube 115 at a position between the isolation valve and chamber A 121. The airbed system is further configured to actuate an isolation valve (not shown) in order to isolate chamber B 122 from the manifold 112 and pneumatically connect a third pressure sensor (not shown) to chamber B 122; wherein the third pressure sensor is connected to the tube 116 at a position between the isolation valve and chamber B 122.

In an embodiment of the described principals, the second pressure sensor is configured to take (1) a static pressure reading corresponding to chamber A 121, or (2) an offset measurement corresponding to atmospheric conditions. The third pressure sensor is configured to take (1) a static pressure reading corresponding to chamber B 122, or (2) an offset measurement corresponding to atmospheric conditions.

Figure 8:
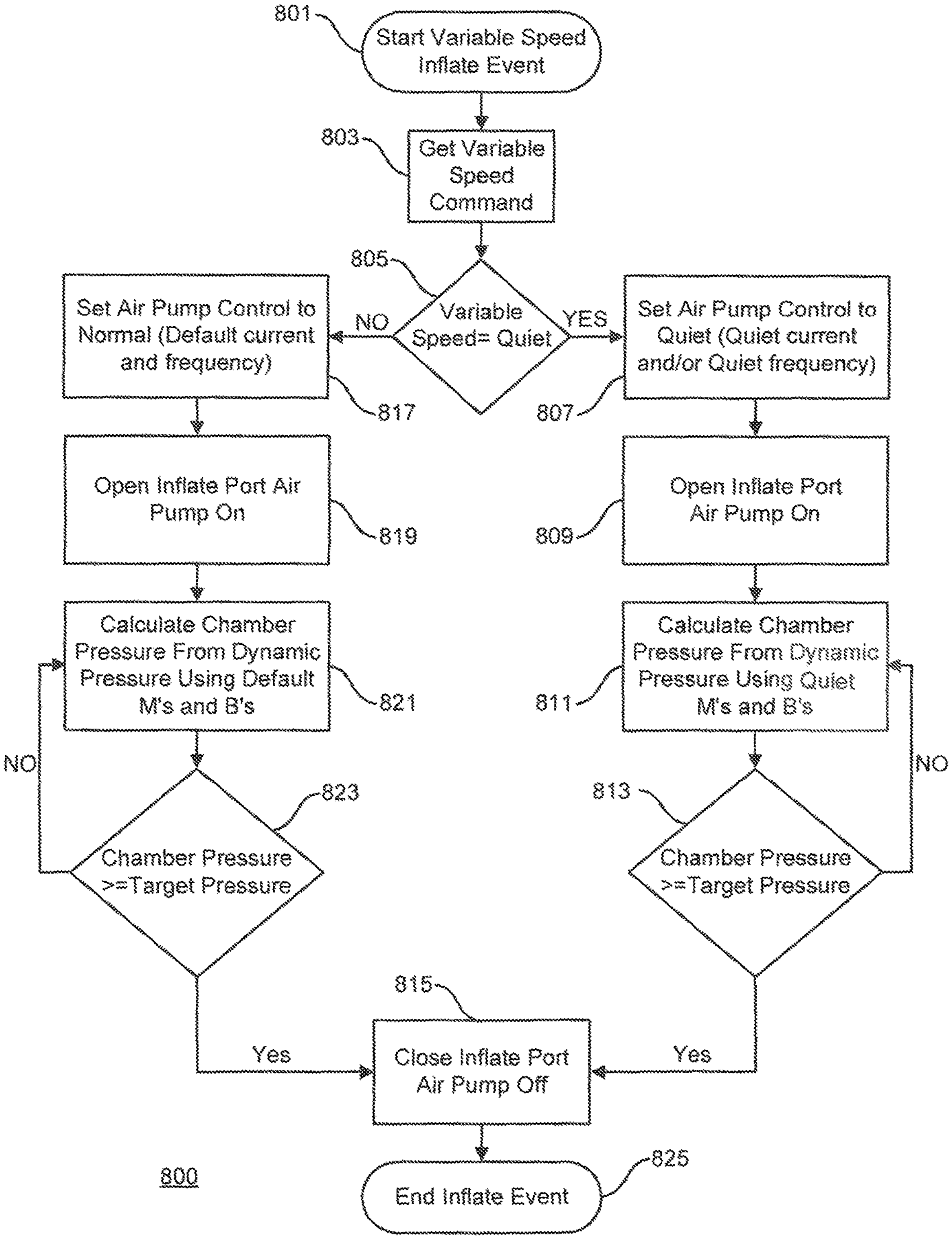
FIG. 8 is a flowchart illustrating an inflate event utilizing embodiments of the described principles.

The flowchart 800 of FIG. 8 illustrates a method for controlling an inflate operation of an air mattress chamber of an air mattress. At stage 801, a variable speed inflate event is initiated with respect to the air mattress 120. The variable speed inflate event may be initiated by receiving a start command from a user input or the control unit, wherein the start command corresponds to inflation of the air mattress chamber.

At stage 803, the control unit obtains a variable speed command corresponding to a mode of operation, and the control unit further determines, at stage 805, whether the control unit should operate in a quiet mode. If it is determined the that control unit should operate in the quiet mode, then, at stage 807, the control unit is set to the quiet mode and the variable speed drive 703 adjusts the speed of the motor to a second predetermined motor speed associated with the quiet mode. At stage 809, a pathway between the manifold and an air mattress chamber (e.g., chamber A 121 or chamber B 122) is created by opening an inflate valve (e.g., valves 705 or 707) to the air mattress chamber, and the pump is turned on in order to inflate the air mattress chamber.

In embodiments of the invention, during inflation of the air mattress chamber, a dynamic inflation pressure measurement is obtained based on an output from a pressure sensor, and a dynamically-obtained static pressure value is determined based on an inflation formula comprising: $SP=M_{mode}*DIP+B_{mode}$, wherein SP is the dynamically-obtained static pressure value, $M_{mode}$ is the first constant associated with the mode of operation, DIP is the dynamic inflation pressure measurement, and $B_{mode}$ is the second constant associated with the mode of operation.

At stage 811, during inflation of the air mattress chamber, obtaining a dynamic inflation pressure measurement based on the dynamic inflation output from the pressure sensor, and determining a dynamically-obtained static pressure value based on a quiet inflation formula comprising: $SP=M_{inflate.quiet}*DIP+B_{inflate.quiet}$, wherein SP is the dynamically-obtained static pressure value, $M_{inflate.quiet}$ is the first quiet inflation constant, DIP is the dynamic inflation pressure measurement, and $B_{inflate.quiet}$ is the second quiet inflation constant. The first quiet inflation constant $M_{inflate.quiet}$ and the second quiet inflation constant $B_{inflate.quiet}$ may be determined using the system calibration procedures described herein (e.g., FIGS. 3A and 3B).

At stage 813, during inflation of the air mattress chamber, comparing the dynamically-obtained static pressure value against a target pressure, and repeating stage 811 if the dynamically-obtained static pressure value is less than the target pressure. If the dynamically-obtained static pressure value is greater than or equal to the target pressure, then, at stage 815, the control unit is configured to close the inflate port to the chamber, turn off the pump, and end the inflate event (at stage 825).

If the control unit determines, at stage 805, that the control unit should not operate in quiet mode, then, at stage 817, the control unit is set to normal mode and the variable speed drive 703 adjusts the speed of the motor to a first predetermined motor speed associated with the normal mode. At stage 819, a pathway between the manifold 112 and an air mattress chamber (e.g., chamber A 121 or chamber B 122) is created by opening an inflate valve (e.g., valves 705 or 707) to the air mattress chamber, and the pump is turned on in order to inflate the air mattress chamber.

At stage 821, during inflation of the air mattress chamber, obtaining a dynamic inflation pressure measurement based on the dynamic inflation output from the pressure sensor, and determining a dynamically-obtained static pressure value based on a normal inflation formula comprising: $SP=M_{inflate.normal}*DIP+B_{inflate.normal}$, wherein SP is the dynamically-obtained static pressure value, $M_{inflate.normal}$ is normal the first inflation constant, DIP is the dynamic inflation pressure measurement, and $B_{inflate.normal}$ is the second normal inflation constant. The first normal inflation constant $M_{inflate.normal}$ and the second normal inflation constant $B_{inflate.normal}$ may be determined using the system calibration procedures described herein (e.g., FIGS. 3A and 3B).

At stage 823, during inflation of the air mattress chamber, comparing the dynamically-obtained static pressure value against a target pressure, and repeating stage 821 if the dynamically-obtained static pressure value is less than the target pressure. If the dynamically-obtained static pressure value is greater than or equal to the target pressure, then, at stage 815, the control unit is configured to close the inflate port to the air mattress chamber, turn off the pump, and end the inflate event (at stage 825).

Figure 9:
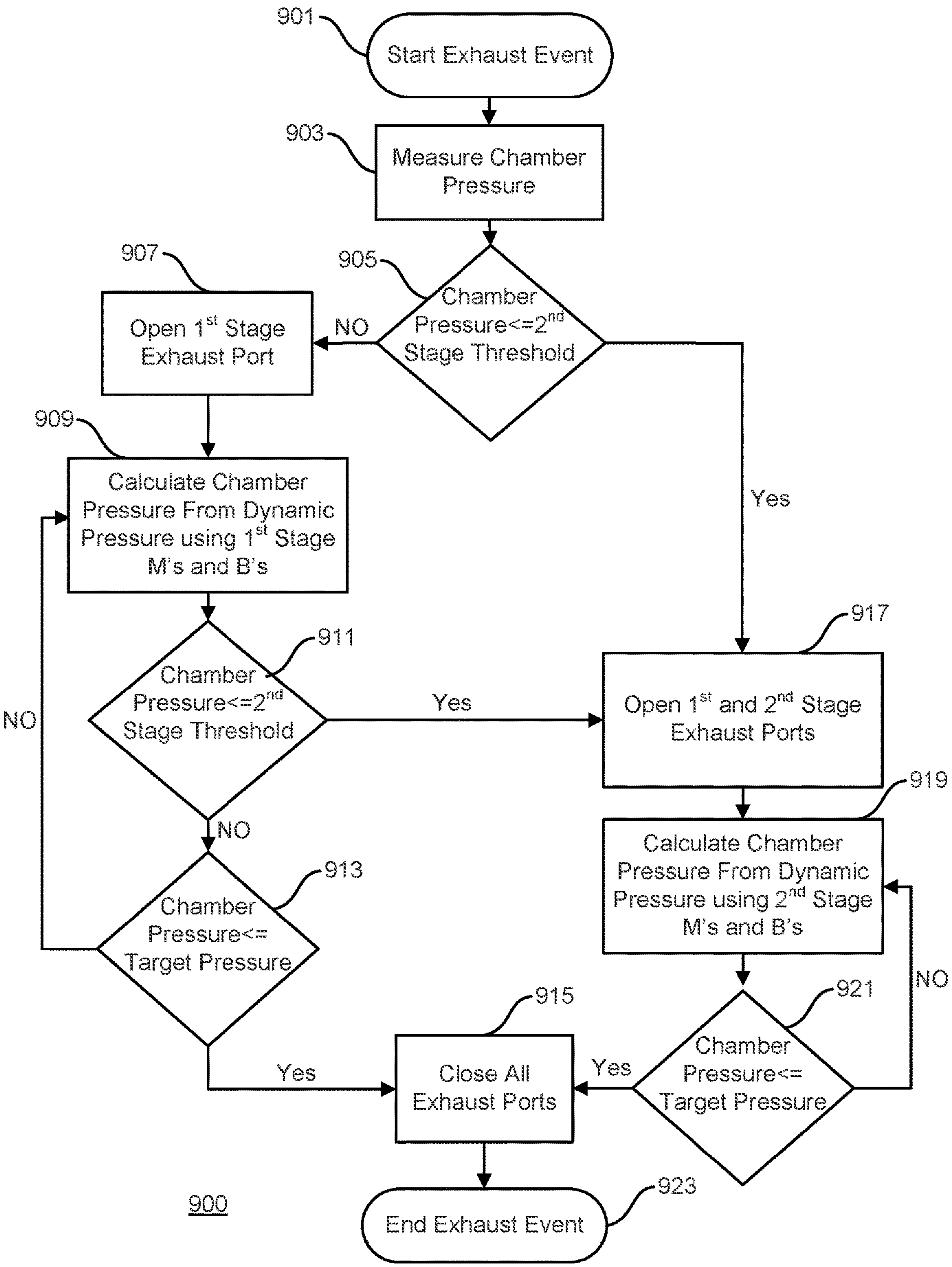
FIG. 9 is a flowchart illustrating a deflate event utilizing embodiments of the described principles.

The flowchart 900 of FIG. 9 illustrates a method for controlling the deflation of an air mattress chamber of an air mattress. At stage 901, a deflate event is initiated with respect to an air mattress chamber of an air mattress through receipt of a deflate command by the control unit 114. The deflate operation may be initiated by receiving a deflate command from a user input, wherein the deflate command corresponding to deflation of the air mattress chamber.

At stage 903, obtaining a static pressure measurement of an air mattress chamber using based on an output from a pressure sensor. At stage 905, comparing the static pressure measurement to a second stage threshold value. At stage 907, if the static pressure measurement is greater than the second stage threshold value, then opening the first stage exhaust port to deflate the air mattress chamber.

At stage 909, during deflation of the air mattress chamber, obtaining a dynamic deflation pressure measurement based on the dynamic deflation output from the pressure sensor, and determining a first dynamically-obtained static pressure value based on a first stage deflation formula comprising: $SP_{first}=M_{deflate.firststage}*DIP+B_{deflate.firststage}$, wherein $SP_{first}$ is the first dynamically-obtained static pressure value, $M_{deflate.firststage}$ is the first deflate constant, DIP is the dynamic deflation pressure measurement, and $B_{deflate.firststage}$ is the second deflate constant. The first deflate constant $M_{deflate.firststage}$ and second deflate constant $B_{deflate.firststage}$ may be determined using the system calibration procedures described herein (e.g., FIGS. 3A and 3B).

At stage 911, comparing the first dynamically-obtained static pressure value to the second stage threshold value, and continuing to stage 913 if the first dynamically-obtained static pressure value is greater than the second stage threshold value.

At stage 913, comparing the first dynamically-obtained static pressure value to a target pressure, and repeating stage 909 if the first dynamically-obtained static pressure value is greater than the target pressure. If the first dynamically-obtained static pressure value is less than or equal to the target pressure, then, at stage 915, closing the first stage exhaust port 709 and the second stage exhaust port 711. At the completion of stage 915, then end the deflate event at stage 923.

If the first dynamically-obtained static pressure value is less than or equal to the second stage threshold value at stage 911, or if the static pressure measurement is less than or equal to the second stage threshold value at stage 905, then, at stage 917, opening the first stage exhaust port (if not already opened at stage 907) and the second stage exhaust port.

At stage 919, during deflation of the air mattress chamber, obtaining a dynamic deflation pressure measurement based on the dynamic deflation output from the pressure sensor, and determining a second dynamically-obtained static pressure value based on a second stage deflation formula comprising: $SP_{second}=M_{deflate.secondstage}*DIP+B_{deflate.secondstage}$, wherein $SP_{second}$ is the second dynamically-obtained static pressure value, $M_{deflate.secondstage}$ is the first deflate constant, DIP is the dynamic deflation pressure measurement, and $B_{deflate.secondstage}$ is the second deflate constant. The first deflate constant $M_{deflate.secondstage}$ and second deflate constant $B_{deflate.secondstage}$ may be determined using the system calibration procedures described herein (e.g., FIGS. 3A and 3B).

At stage 921, comparing the second dynamically-obtained static pressure value to a target pressure, and repeating stage 919 if the second dynamically-obtained static pressure value is greater than the target pressure. If the second dynamically-obtained static pressure value is less than or equal to the target pressure, then continue to stage 915.

Further Considerations

In certain air mattress configurations, some of the air mattress chambers may have shared walls such that inflation/deflation of one chamber will affect the pressure in one or more adjacent chambers. In such shared-wall implementations, multiple inflate and/or deflate operations may be required to get all chambers to their respective desired pressures within an accuracy of +/−0.1 psi. For example, for an air mattress with connected Head/Foot chambers and a separate Lumbar chamber sharing walls with the Head and Foot chambers, getting the correct pressures into all three chambers may require multiple operations to be performed (e.g., adjustment of the Head/Foot chambers→adjustment of the Lumbar chamber→readjustment of the Head/Foot chambers→readjustment of the Lumbar chamber). Since embodiments of the invention are able to quickly and accurately determine dynamically-obtained static chamber pressure based on the dynamic manifold pressure readings taken by a pressure sensor, such multiple pass-through operation situations can be quickly and efficiently completed.

In further embodiments of the invention, the effects of thermodynamic cooling are accounted for by the control unit by providing deliberate overfilling based on the length of an inflate operation. This is because, particularly for relatively long inflate operations, the pressure within the chamber will drop slightly after the inflation operation is completed due to thermodynamic cooling. Thus, for example, when filling a chamber of the air mattress to 0.75 psi (e.g., the max pressure in an auto-fill operation), the airbed system may actually fill the air mattress to, for example, 0.78 psi, since thermodynamic cooling will subsequently cause the pressure in the air mattress to drop back down to 0.75 psi (e.g., within around 20 seconds). The amount of overfill is proportional relative to the length of the fill (and may be based on an parameter stored at the control unit, which in certain implementations, may be updatable based on actual pressure readings taken by the pressure sensor). In certain implementations, the pressure displayed to the user on a user remote (or other computing device) may inherently take into account the thermodynamic cooling such that it displays only what the pressure is expected to be after thermodynamic cooling has occurred (e.g., the remote will display 0.75 psi even as the chamber is actually filled to 0.78 psi, since the chamber will shortly come back down to 0.75 psi).

In addition to the offset calibration and the system calibration processes discussed above, it will be appreciated that, when using low-cost pressure transducers, the pressure transducers themselves may need certain hardware calibration procedures performed thereon. While pre-calibrated pressure transducers exist, such pre-calibrated pressure transducers cost significantly more than uncalibrated pressure transducers. Thus, to be able to use lower-cost, uncalibrated pressure transducers, the pressure transducers themselves may be calibrated to establish a gain factor which is used to compensate for variations that exist from pressure transducer to pressure transducer. This is performed by exposing the transducer to a known pressure source and calculating the gain required to generate the "correct" output corresponding to the known pressure source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Having described the disclosed subject matter, what is claimed as new and desired to be secured by Letters Patent is:

1. A method for inflating or deflating an air mattress chamber of an air mattress, the method comprising:

receiving, by an airbed system, a user input corresponding to inflation or deflation of the air mattress chamber;

inflating or deflating, by the airbed system, the air mattress chamber based on the user input; and during the inflation or deflation, obtaining, by the airbed system, a dynamic pressure measurement based on an output from a pressure sensor of the airbed system and determining, by the airbed system, a dynamically-obtained static pressure value based on the dynamic pressure measurement, a first constant, and a second constant;

wherein the dynamically-obtained static pressure value determined based on the dynamic pressure measurement corresponds to a static pressure measurement that would be obtained if the inflation or deflation was stopped at a point the dynamic pressure measurement was obtained with the static pressure measurement being taken under static airflow conditions subsequent to stopping the inflation or deflation.

2. The method according to claim 1, the method further comprising:

comparing the dynamically-obtained static pressure value to a threshold value; and in response to a result of comparing step, stopping the inflating or deflating of the air mattress chamber.

3. The method according to claim 1, the method further comprising:

presenting the determined dynamically-obtained static pressure value to a user on a display of a user remote of the airbed system.

4. The method according to claim 1, wherein the inflating or deflating of the air mattress chamber is performed for a first period of time; and wherein the method further comprising:

obtaining a first dynamic pressure measurement during the inflating or deflating proximate to an end of the first period of time;

stopping the inflating or deflating at the end of the first period of time;

waiting a second period of time;

obtaining a first static pressure measurement after the second period of time; and updating the first constant and the second constant based on the first dynamic pressure measurement and the first static pressure measurement.

5. The method according to claim 1, the method further comprising:

exposing the pressure sensor to an external environment; and performing an offset measurement while the pressure sensor is exposed to the external environment;

wherein the offset measurement is used in obtaining the dynamic pressure measurement.

6. The method according to claim 1, wherein the first constant and the second constant correspond to inflation of the air mattress chamber, and are determined or updated based on a calibration procedure comprising:

inflating the air mattress chamber for a first period of time, obtaining a first dynamic pressure measurement during inflation proximate to an end of the first period of time, stopping the inflation at the end of the first period of time, waiting a second period of time, and obtaining a first static pressure measurement after the second period of time;

inflating the air mattress chamber after obtaining the first static pressure measurement for a third period of time, obtaining a second dynamic pressure measurement during inflation proximate to an end of the third period of time, stopping the inflation at the end of the third period of time, waiting a fourth period of time, and obtaining a second static pressure measurement after the fourth period of time; and determining the first and second constants based on the first dynamic pressure measurement, the first static pressure measurement, the second dynamic pressure measurement, and the second static pressure measurement.

7. The method according to claim 6, wherein the determining step further comprising:

calculating the first constant based on a M formula comprising: $M=(DP_2-DP_1)/(SP_2-SP_1)$, wherein M is the first constant, $DP_2$ is the second dynamic pressure measurement, $DP_1$ is the first dynamic pressure measurement, $SP_2$ is the second static pressure measurement, and $SP_1$ is the first static pressure measurement.

8. The method of claim 6, wherein the determining step further comprising:

calculating the second constant based on a B formula comprising: $B=SP_2-(M*DP_2)$, wherein B is the second constant, $SP_2$ is the second static pressure measurement, M is the first constant, and $DP_2$ is the second dynamic pressure measurement.

9. The method according to claim 1, wherein the first constant and the second constant correspond to deflation of the air mattress chamber, and are determined or updated based on a calibration procedure comprising:

deflating the air mattress chamber for a first period of time, obtaining a first dynamic pressure measurement during deflation proximate to an end of the first period of time, stopping the deflation at the end of the first period of time, waiting a second period of time, and obtaining a first static pressure measurement after the second period of time;

deflating the air mattress chamber after obtaining the first static pressure measurement for a third period of time, obtaining a second dynamic pressure measurement during deflation proximate to an end of the third period of time, stopping the deflation at the end of the third period of time, waiting a fourth period of time, and obtaining a second static pressure measurement after the fourth period of time; and determining the first and second constants based on the first dynamic pressure measurement, the first static pressure measurement, the second dynamic pressure measurement, and the second static pressure measurement.

10. The method according to claim 9, wherein the determining step further comprising:

calculating the first constant based on a M formula comprising: $M=(DP_2-DP_1)/(SP_2-SP_1)$, wherein M is the first constant, $DP_2$ is the second dynamic pressure measurement, $DP_1$ is the first dynamic pressure measurement, $SP_2$ is the second static pressure measurement, and $SP_1$ is the first static pressure measurement.

11. The method of claim 9, wherein the determining step further comprising:

calculating the second constant based on a B formula comprising: $B=SP_2-(M*DP_2)$, wherein B is the second constant, $SP_2$ is the second static pressure measurement, M is the first constant, and $DP_2$ is the second dynamic pressure measurement.

12. The method according to claim 1, wherein the dynamically-obtained static pressure value is based a formula comprising: $SP=M*DP+B$, wherein SP is the dynamically-obtained static pressure value, M is the first constant, DP is the dynamic pressure measurement, and B is the second constant.

13. The method according to claim 1, the method further comprising:

filtering the output based on the pressure sensor over a latency period; and performing a latency qualification such that the dynamic inflation pressure measurement corresponds to the filtered output.

14. A method for controlling an inflate operation of an air mattress chamber of an air mattress, the method comprising:

receiving, by an airbed system, a start command corresponding to inflation of the air mattress chamber;

obtaining, by the airbed system, a variable speed command corresponding to a mode of operation;

adjusting, by the airbed system, a speed of a motor to a predetermined motor speed based on the mode of operation;

inflating, by the airbed system, the air mattress chamber based on the predetermined motor speed; and during the inflation, obtaining, by the airbed system, a dynamic inflation pressure measurement based on an output from a pressure sensor, and determining a dynamically-obtained static pressure value based on an inflation formula comprising: $SP=M_{mode}*DIP+B_{mode}$, wherein SP is the dynamically-obtained static pressure value, $M_{mode}$ is a first constant associated with the mode of operation, DIP is the dynamic inflation pressure measurement, and $B_{mode}$ is a second constant associated with the mode of operation;

wherein the dynamically-obtained static pressure value determined based on the dynamic pressure measurement corresponds to a static pressure measurement that would be obtained if the inflation operation was stopped at a point the dynamic pressure measurement was obtained with the static pressure measurement being taken under static airflow conditions subsequent to stopping the inflation operation.

15. The method of claim 14, the method further comprising:

stopping the inflation operation if the dynamically-obtained static pressure value is greater than a target pressure.

16. The method of claim 14, wherein the mode of operation comprising one of a normal mode having a first predetermined motor speed, or a quiet mode having a second predetermined motor speed, the first predetermined motor speed being greater than the second predetermined motor speed.

17. A method for controlling the deflation of an air mattress chamber of an air mattress, the method comprising:

providing an airbed system comprising a first stage exhaust port configured for pneumatic communication with the air mattress chamber;

receiving, by the airbed system, a deflate command corresponding to deflation of the air mattress chamber;

obtaining, by the airbed system, a static pressure measurement of the air mattress chamber based on an output from a pressure sensor;

comparing the static pressure measurement to a second stage threshold value;

opening, by the airbed system, the first stage exhaust port if the static pressure measurement is greater than the second stage threshold value;

deflating the air mattress chamber; and during the deflation, obtaining, by the airbed system, a dynamic deflation pressure measurement based on a dynamic deflation output from the pressure sensor, and determining a first dynamically-obtained static pressure value based on a first stage deflation formula comprising: $SP_{first}=M_{deflate.firststage}*DIP+B_{deflate.firststage}$, wherein $SP_{first}$ is the first dynamically-obtained static pressure value, $M_{deflate.firststage}$ is a first deflate constant associated with the first stage exhaust port, DIP is the dynamic deflation pressure measurement, and $B_{deflate.firststage}$ is a second deflate constant associated with the first stage exhaust port;

wherein the first dynamically-obtained static pressure value determined based on the dynamic deflation pressure measurement corresponds to a static pressure measurement that would be obtained if the deflation was stopped at a point the dynamic deflation pressure measurement was obtained with the static pressure measurement being taken under static airflow conditions subsequent to stopping the deflation.

18. The method of claim 17, the method further comprising:

closing the first stage exhaust port when the first dynamically-obtained static pressure value is less than or equal to a target pressure.

19. A method for controlling the deflation of an air mattress chamber of an air mattress, the method comprising:

providing an airbed system comprising:

a first stage exhaust port; and a second stage exhaust port;

wherein the first and second stage exhaust ports are configured for pneumatic communication with the air mattress chamber;

receiving, by the airbed system, a deflate command corresponding to deflation of the air mattress chamber;

obtaining, the by the airbed system, a static pressure measurement of the air mattress chamber based on an output from a pressure sensor;

comparing the static pressure measurement to a second stage threshold value;

opening, by the airbed system, the first stage exhaust port if the static pressure measurement is greater than the second stage threshold value;

deflating the air mattress chamber;

during the deflation, obtaining, by the airbed system, a dynamic deflation pressure measurement based on a dynamic deflation output from the pressure sensor, and determining a first dynamically-obtained static pressure value based on a first stage deflation formula comprising: $SP_{first}=M_{deflate.firststage}*DIP+B_{deflate.firststage}$, wherein $SP_{first}$ is the first dynamically-obtained static pressure value, $M_{deflate.firststage}$ is a first deflate constant associated with the first stage exhaust port, DIP is the dynamic deflation pressure measurement, and $B_{deflate.firststage}$ is a second deflate constant associated with the first stage exhaust port;

opening, by the airbed system, the second stage exhaust port if the first dynamically-obtained static pressure value is less than or equal to the second stage threshold value; and during the deflation, obtaining, by the airbed system, a dynamic deflation pressure measurement based on a dynamic deflation output from the pressure sensor, and determining a second dynamically-obtained static pressure value based on a second stage deflation formula comprising: $SP_{second}=M_{deflate.secondstage}*DIP+B_{deflate.secondstage}$, wherein $SP_{second}$ is the second dynamically-obtained static pressure value, $M_{deflate.secondstage}$ is a first deflate constant associated with the second stage exhaust port, DIP is the dynamic deflation pressure measurement, and $B_{deflate.secondstage}$ is a second deflate constant associated with the second stage exhaust port;

wherein the first and second dynamically-obtained static pressure values determined based on the dynamic deflation pressure measurement correspond to a static pressure measurements that would be obtained if the deflation was stopped at a point the dynamic deflation pressure measurements were obtained with the static pressure measurement being taken under static airflow conditions subsequent to stopping the deflation.

20. The method of claim 19, the method further comprising:

closing, by the airbed system, the first stage exhaust port and the second stage exhaust port if the second dynamically-obtained static pressure value is less than or equal to a target pressure.

21. The method of claim 19, wherein the first stage exhaust port comprises:

a first head loss coefficient, and the second stage exhaust port comprises a second head loss coefficient;

wherein the first head loss coefficient is greater than the second head loss coefficient.

22. The method of claim 19, wherein the first stage exhaust port comprises a flow restrictor.

23. A method for controlling the deflation of an air mattress chamber of an air mattress, the method comprising:

providing an airbed system comprising:

a first stage exhaust port; and a second stage exhaust port;

wherein the first and second stage exhaust ports are configured for pneumatic communication with the air mattress chamber;

receiving, by the airbed system, a deflate command corresponding to deflation of the air mattress chamber;

obtaining, by the airbed system, a static pressure measurement of the air mattress chamber based on an output from a pressure sensor;

comparing the static pressure measurement to a second stage threshold value;

opening, by the airbed system, the first stage exhaust port and the second stage exhaust port if the static pressure measurement is less than or equal to the second stage threshold value;

deflating the air mattress chamber; and during the deflation, obtaining, by the airbed system, a dynamic deflation pressure measurement based on a dynamic deflation output from the pressure sensor, and determining a second dynamically-obtained static pressure value based on a second stage deflation formula comprising: $SP_{second}=M_{deflate.secondstage}*DIP+B_{deflate.secondstage}$, wherein $SP_{second}$ is the second dynamically-obtained static pressure value, $M_{deflate.secondstage}$ is a first deflate constant associated with the second stage exhaust port, DIP is the dynamic deflation pressure measurement, and $B_{deflate.secondstage}$ is a second deflate constant associated with the second stage exhaust port;

wherein the second dynamically-obtained static pressure value determined based on the dynamic deflation pressure measurement corresponds to a static pressure measurement that would be obtained if the deflation was stopped at a point the dynamic deflation pressure measurement was obtained with the static pressure measurement being taken under static airflow conditions subsequent to stopping the deflation.

24. The method of claim 23, the method further comprising:

closing, by the airbed system, the first stage exhaust port and the second stage exhaust port if the second dynamically-obtained static pressure value is less than or equal to a target pressure.

25. The method of claim 23, wherein the first stage exhaust port comprises a first head loss coefficient; wherein the second stage exhaust port comprises a second head loss coefficient; and wherein the first head loss coefficient is greater than the second head loss coefficient.

26. The method of claim 23, wherein the first stage exhaust port comprises a flow restrictor.

* * * * *